United States Patent
Spagnolo et al.

(10) Patent No.: US 11,886,620 B2
(45) Date of Patent: *Jan. 30, 2024

(54) APP ACTIONS IN A CONTENT MANAGEMENT SYSTEM

(71) Applicant: Contentful GmbH, Berlin (DE)

(72) Inventors: Manuel Spagnolo, Berlin (DE); Fabian Schultz, Berlin (DE); Paolo Negri, Berlin (DE); Ryan Scott, Berlin (DE)

(73) Assignee: Contentful GmbH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/846,646

(22) Filed: Jun. 22, 2022

(65) Prior Publication Data
US 2023/0418982 A1    Dec. 28, 2023

(51) Int. Cl.
*G06F 21/00* (2013.01)
*G06F 21/62* (2013.01)
*G06F 9/54* (2006.01)
*G06F 21/44* (2013.01)

(52) U.S. Cl.
CPC ............ *G06F 21/629* (2013.01); *G06F 9/547* (2013.01); *G06F 21/44* (2013.01); *G06F 2221/2141* (2013.01)

(58) Field of Classification Search
CPC ........ G06F 21/629; G06F 9/547; G06F 21/44; G06F 2221/2141
See application file for complete search history.

(56) References Cited

U.S. PATENT DOCUMENTS

| | | | |
|---|---|---|---|
| 7,472,170 B2 * | 12/2008 | Zak | G06F 40/14 709/228 |
| 9,537,808 B1 * | 1/2017 | Giansiracusa | H04L 51/18 |
| 2014/0229839 A1 * | 8/2014 | Lynch | G06F 3/0482 715/736 |
| 2014/0282497 A1 * | 9/2014 | Farm | G06Q 30/02 717/176 |
| 2017/0346802 A1 * | 11/2017 | Gruskin | G06F 8/62 |
| 2018/0285405 A1 * | 10/2018 | Chan | G06F 16/1734 |

* cited by examiner

*Primary Examiner* — Ghazal B Shehni
(74) *Attorney, Agent, or Firm* — Penilla IP, APC

(57) ABSTRACT

A method implemented in a content management system (CMS) is provided, for providing integration between APPS configured for use with an editor application of the CMS, including: installing a first APP and a second APP in a content project of the CMS, wherein installing the first and second APPs enables functionalities of the first and second APPs to be accessed for the content project through the editor application, wherein the editor application provides an interface for editing the content project; receiving from the first APP a request to invoke an action by the second APP; responsive to receiving the request, then validating contents of the request; responsive to successful validation of the request, then sending an acknowledgement to the first APP, and generating a call to the second APP to invoke the action by the second APP.

21 Claims, 14 Drawing Sheets

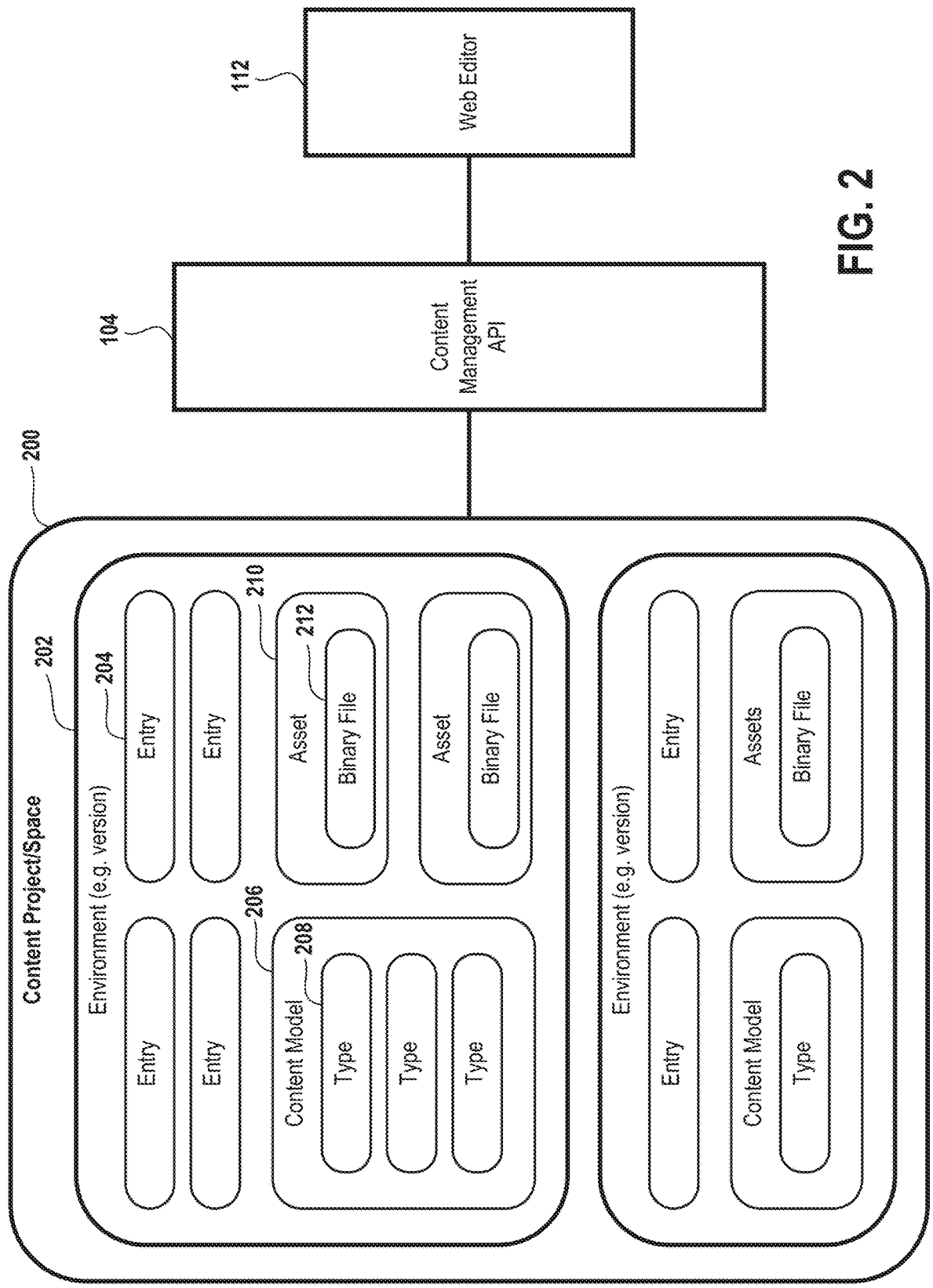

APP ACTIONS IN A CONTENT MANAGEMENT SYSTEM

1. FIELD OF THE DISCLOSURE

The present disclosure relates to inter-app action triggering in a content management system.

BACKGROUND

2. Description of the Related Art

A content management system (CMS) provides many benefits by allowing users to flexibly structure and manage content, independent of the presentation of such content through various contexts such as websites and mobile apps. Content can be composed in a modular format, enabling an individual piece of content to be created once, and then reused across different presentation contexts. Further, the appearance of content can be adjusted to suit the presentation context at the time it is retrieved and presented to the consuming end user.

Customers of a CMS may build more functionality as apps which can extend editing capabilities when interfacing with the CMS. However, such apps do not work together, and therefore many potential benefits of a modular platform are not realized.

It is in this context that implementations of the disclosure arise.

SUMMARY

Implementations of the present disclosure include methods and systems relating to inter-app action triggering in a content management system.

A method implemented in a content management system (CMS) is provided, for providing integration between APPS configured for use with an editor application of the CMS, including: installing a first APP and a second APP in a content project of the CMS, wherein installing the first and second APPs enables functionalities of the first and second APPs to be accessed for the content project through the editor application, wherein the editor application provides an interface for editing the content project; receiving from the first APP a request to invoke an action by the second APP; responsive to receiving the request, then validating contents of the request; responsive to successful validation of the request, then sending an acknowledgement to the first APP, and generating a call to the second APP to invoke the action by the second APP.

In some implementations, the method enables the first APP to trigger the action by the second APP without requiring the first APP to communicate with the second APP.

In some implementations, the request from the first APP to invoke the action by the second APP is received through an API of the CMS.

In some implementations, validating the contents of the request includes verifying whether the contents of the request adhere to predefined parameter requirements for invoking the action by the second APP.

In some implementations, further responsive to receiving the request, authorizing the request, wherein authorizing the request includes verifying, based on a setting of the content project, that the first APP is authorized to request to invoke the action by the second APP.

In some implementations, installing the second APP exposes the action of the second APP for invocation through the CMS during editing of the content project.

In some implementations, installing the first APP includes configuring a permission setting of the content project to allow the first APP to invoke the action of the second APP.

In some implementations, the acknowledgement indicates the successful validation of the request.

In some implementations, the call to the second APP is configured to be asynchronous, such that the CMS does not wait for a result of the call to the second APP.

In some implementations, the content project includes a plurality of content types and a plurality of content entries, said content entries being structured in accordance with said content types, said content entries being configured to store content of the content project that is editable through the editor application.

In some implementations, the editor application is defined by a web application rendered through a client browser.

In some implementations, the request from the first APP is received in response to occurrence of a predefined event of the first APP, such that the method enables automated triggering of the action of the second APP in response to the occurrence of the predefined event of the first APP.

In some implementations, the call to the second APP is defined by an HTTP call to a URL of the second APP.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 2 conceptually illustrates a content project (also termed a space), in accordance with implementations of the disclosure.

FIG. 9A illustrates an example of an interface for an app in a CMS, in accordance with implementations of the disclosure.

FIG. 9B illustrates the interface for an app in a CMS, in accordance with the implementation of FIG. 9A.

FIG. 9C illustrates the interface for an app in a CMS, in accordance with the implementation of FIG. 9B.

FIG. 9D illustrates the interface for an app in a CMS, in accordance with the implementation of FIG. 9C.

DETAILED DESCRIPTION

The following implementations of the present disclosure provide methods and systems relating to inter-app action triggering in a content management system.

It will be obvious, however, to one skilled in the art, that the present disclosure may be practiced without some or all of the specific details presently described. In other instances, well known process operations have not been described in detail in order not to unnecessarily obscure the present disclosure.

Broadly speaking, implementations of the present disclosure provide systems and methods to enable apps to trigger each other's functionality. Mechanisms are provided that define how apps can invoke actions by other apps, and what protocols are defined to enable this while maintaining security of the CMS and the apps. This enables inter-app action triggering in a structured manner that is not open to potential exploitation or otherwise insecure.

In accordance with implementations described herein, apps do not communicate directly with each other, but rather the CMS acts as a proxy between apps. Triggering of actions between apps can be required to be explicitly allowed by the user. Further, the CMS ensures adherence to policies so that only allowed communications trigger invocations of actions by another app.

The provider of an app provides a schema defining parameters of an acceptable communication, and the consuming app that wishes to call this action communicates to the CMS. The CMS validates the communication from the consuming app, and then asynchronously generates the appropriate call to the providing app.

The asynchronous setup is a "fire-and-forget" setup so that inter-app invocations do not pose a security problem. If the CMS were to wait for the providing app to complete the requested action, then the CMS would be dependent on third parties. Thus, in some implementations, the consuming app receives an acknowledgement of its request from the CMS, but not necessarily any further confirmation of a specific result from the providing app whose action is being triggered. The CMS does not wait for the providing app to complete the action or otherwise respond.

A set of endpoints is provided allowing actors in the extended CMS platform to securely trigger actions exposed by apps installed in a given content project. In some implementations more specifically, app backends are enabled to communicate with each other. This enables encapsulation and reusability of common pieces of logic, giving the app framework more flexibility and robustness.

Figure 1:
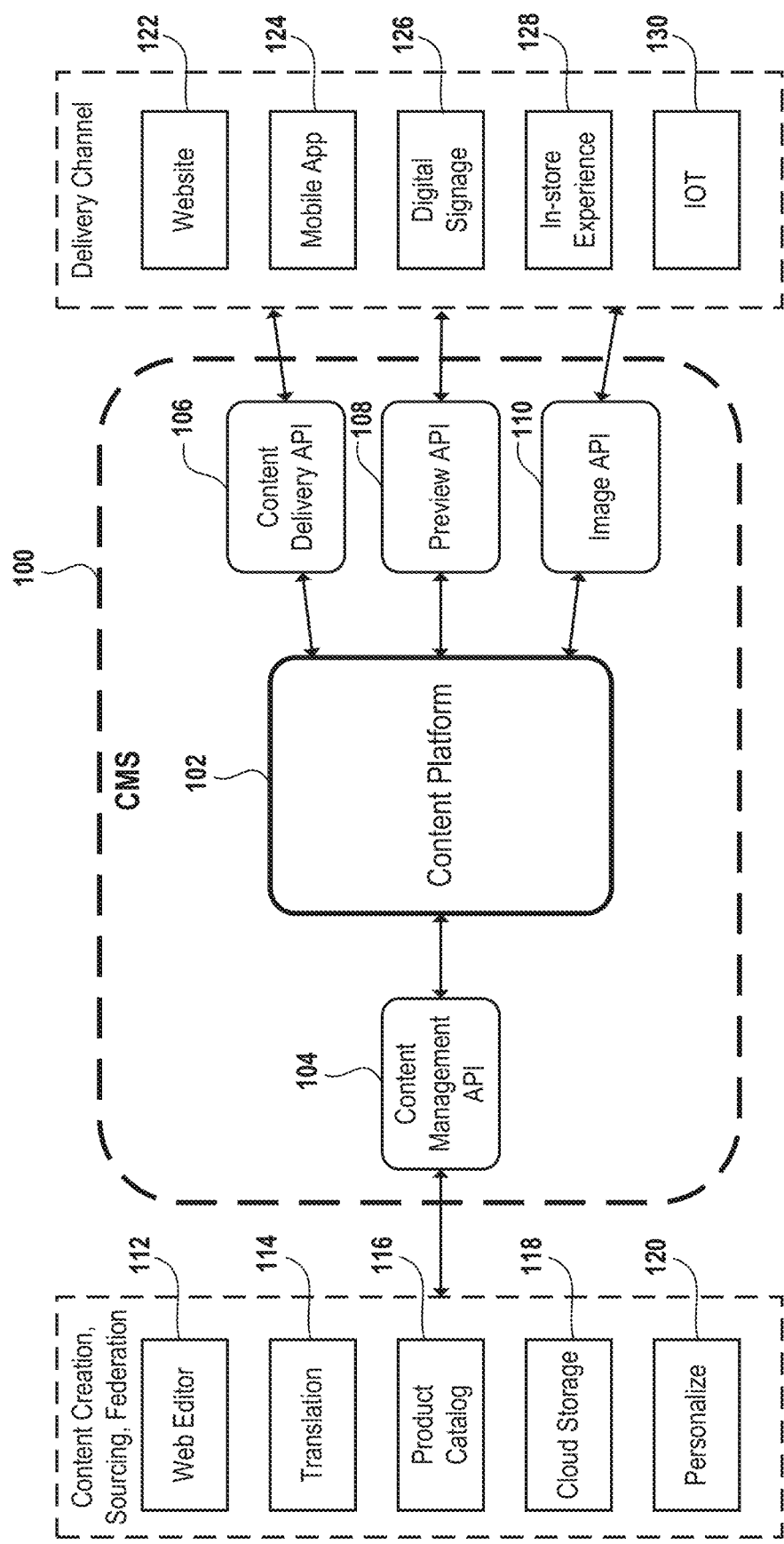
FIG. 1 conceptually illustrates a content management system (CMS) 100, and entities that interact with the CMS 100, in accordance with implementations of the disclosure.

FIG. 1 conceptually illustrates a content management system (CMS) 100, and entities that interact with the CMS 100, in accordance with implementations of the disclosure.

Broadly speaking, a content management system (CMS) is a system that facilitates and manages the creation, storage, editing, and delivery of digital content. One example of a CMS is provided by Contentful GmbH (https://www.contentful.com). In a CMS in accordance with implementations of the disclosure, content can be distinguished from the context/channel in which such content is presented. That is, content is modularized and separated from its appearance in a given presentation context through which the content is presented and actually consumed by the end user. Examples of presentation contexts include websites, mobile apps, digital signage, in-store digital experiences, etc.

Content generally consists of content items which can be of various types. Examples of types of content items include text, images, audio, video, data values, etc. Content items are typically stored as data structures in the CMS (e.g. JSON data structures containing text, metadata, links, tags, etc.), and in some implementations, include raw text, media, or data files. Hence, content is stored and delivered in a generic format, and formatting is later applied in the end application that defines the presentation context. For example, appearance determinations such as fonts, colors, alignment, etc. are applied to text or media content items by a website or mobile app. Thus, the final appearance of content is not determined at its creation, but rather is dynamically determined by the context in which the content will appear.

Content items can be flexibly configured to enable specific content items for specific purposes to be defined. For example, the content items which comprise a typical rendering of a news article by a newspaper/publication may include the following: title of the newspaper/publication, place/location, date, copyright information, article title, subtitle, author, body, photo/image, photographer name, photo/image caption, etc. Each of these content items can be separately stored and independently delivered as needed to suit different contexts of presentation. For example, a news article appearing on a news website will be configured to present the article in a different format/style than when the same article appears in a social media feed, on a digital sign, or in another context.

Broadly speaking, the CMS 100 provides a content platform 102 to unify and structure content for improved content management and delivery. Access to and management of the content is provided through various application programming interfaces (API's). In some implementations, creation, editing, federation and other management of content is mediated through a content management API 104. In some implementations, the content management API 104 is a read-write API for managing content. In some implementations, the content management API 104 requires authentication as a user of the CMS. The content management API 104 enables one to programmatically create or update content items. It will be appreciated that the content management API 104 can be used for a variety of purposes, including by way of example without limitation, creation and editing of content in the content platform, automatic imports from other content sources/repositories, integration with other backend systems (e.g. an e-commerce shop), building custom editing experiences, etc.

For example, a web editor 112 is implemented to provide a web-based user interface for creating and editing content, the web editor accessing the content management API to generate new content items in the system, retrieve and edit existing content items, store changes to content items, etc.

In some implementations, content is localized in part by translation logic 114, which enables translation (in some implementations, causes translations) of the content into the local language of the delivery context. Thus, translation logic 114 may access the content management API 104 to retrieve, generate, and store translations of content in the CMS 100, as well as configure such translations for presentation in the appropriate contexts.

In some implementations, the content platform 102 of the CMS 100 can be integrated with other systems via the content management API 104. In some implementations, content can be sourced/mined/imported from, or synchronized with, an existing repository of content. For example, an existing product catalog 116 may be maintained including information about products such as product names, categorizations, descriptions, price information, related media, etc. and such a product catalog system can be configured to import or update content, or otherwise effect content management actions so as to integrate with the CMS 100 via the content management API 104. In some implementations, a cloud storage system 118 can similarly integrate with the CMS 100 via the content management API 104.

In some implementations, a personalization system 120 is enabled to effect content personalization via the content management API 104. Personalization information can be utilized to enable customization of content or downstream customization of content delivery. Examples of personalization information can include user demographic information (e.g. age, gender, ethnicity, etc.), geolocation, user content consumption history, user preference information, user purchase history, etc. Such personalization information can be utilized by the personalization system 120 to customize content via the content management API, and the selection and presentation of content through a given context.

As noted, content is separated from its presentation, so that the specific appearance of delivered content is determined by or otherwise based on the downstream context/channel through which the content is delivered (e.g. website, mobile app, digital signage, in-store experience, etc.). To this end, various API's are provided for enabling such presentation contexts/channels to access the CMS to obtain the appropriate content for presentation. For example, a content delivery API 106 is exposed to enable retrieval of content items and delivery of said content items to the presentation context. In some implementations, the content delivery API 106 is configured as a read-only API for delivering content from the CMS 100 to apps, websites and other media. In some implementations, content can be delivered as JSON data, and images, videos and other media as files. The content delivery API 106 can be made available via a globally distributed content delivery network (CDN), so that the server closest to the user serves all content, both JSON and binary. This minimizes latency, which especially benefits potentially bandwidth-constrained delivery contexts, such as mobile apps. Hosting content in multiple global data centers also greatly improves the availability of content.

In some implementations, a content preview API 108 is provided, which is a variant of the content delivery API 106 for previewing content before delivering it to live customers. The content preview API 108 can be used in combination with a preview deployment, e.g. preview deployment of a website or a preview build of a mobile app, that allows content managers and authors to view their work in-context, as if it were published, using a preview access token as though it were delivered by the content delivery API 106.

In some implementations, an images API 110 is provided, enabling image transformations/adjustments, such as resizing and cropping of images, changing their background color and converting them to different formats. Using the images API 110 for these transformations allows users to upload high-quality assets, while delivering images suitable and optimized for the delivery channel, and leveraging the benefits of a caching content delivery network.

It will be appreciated that content can be delivered from the CMS 100 to any of various delivery channels/contexts, such as a website 122, mobile app 124, digital signage 126, in-store experience 128, Internet-of-things (IOT) device 130, etc.

In some implementations, the CMS 100 is configured to have the following main entity types: user, organization, space, and environment.

A user is an entity with an account in the CMS. Users can be invited to an existing organization, or sign up individually. If a user has signed up individually, a new organization is automatically created. An existing user can create additional organizations or be invited to other existing organizations. In some implementations, users have management authentication credentials attached to them, such as OAuth applications, OAuth tokens, and personal access tokens.

An organization is an entity that serves as a way to group users and group spaces (content projects). In some implementations, the organization also links member users to a billing entity, so subscriptions and invoices are tied to the organization, rather than to a specific user.

In some implementations, the CMS implements a role-based access model. For example, users can be invited to join an organization and those users will have different levels of access based on their organizational role.

In some implementations of the CMS, a space or a content project is a child of the organization, and serves as a container for the organization's content and any settings related to that content. Spaces allow one to separate data according to the structure of projects or services.

Various settings can apply to a given space or content project. For example, users of a space can be defined as members of the parent organization who belong to the space, and their respective access roles can be defined. Roles and permissions can be defined to set user access levels within the space. API keys can be defined, so that in order to retrieve content through one of the CMS's APIs, a key has to be provided for authentication. For example, in some implementations, an API key is required to be provided in order to access published content through the content delivery API or to access unpublished content through the preview API. Webhooks can be configured to send requests (e.g. HTTP requests) triggered by changes to a content model, content, or media. Content preview functionality is supported, providing a link within the entry editor to a pre-production environment that uses the preview API to access unpublished content.

In some implementations of the CMS, environments are defined as entities within a space that allow one to create and maintain multiple versions of the space-specific data and configuration, and make changes to them in isolation. Hence, in some implementations, each space has one environment by default, which may be termed a master environment. Additionally, multiple sandbox environments can be created. These sandbox environments allow one to modify the data in a space without affecting the data in the master environment. In some implementations, an environment alias can be implemented to allow one to access and modify the data of a target environment, through a different static identifier. For example, a master alias ID can be implemented to reference or point to the environment that is deemed to be the current production version, and accordingly API calls using the master alias ID will access the referenced environment. It will be appreciated that the master alias ID can be easily switched to another environment as needed, conveniently facilitating rollout of a new version of content or rollback to a prior version.

In some implementations, environments include a content model, content, and media. The content model is a collection of content types, which define the structure of the content. The content is defined as a collection of entries. Media is defined as a collection of assets.

A plurality of settings can apply to environments. For example, in some implementations, there are locales settings to manage and deliver content in multiple languages, or otherwise customize content delivery based on delivery geo-location. In some implementations, user interface (UI) extensions are supported, to enable building of customized editing experiences for the web editor. In some implementations, app installations are supported, extending and expanding the capabilities of the CMS web application.

FIG. 2 conceptually illustrates a content project (also termed a space), in accordance with implementations of the disclosure.

In the illustrated implementation, content is organized in content projects, such as an exemplary content project 200, that groups together all the related resources for a given project. This can include content entries, media assets, and settings for localizing content into different languages. Each content project has a content model that represents and defines the content types one can create for the content project.

In some implementations, all content types have standard fields that contain basic information about the content type, its fields and meta data (e.g. system properties, name of the content type, description of the content type, listing of fields, ID of main field used for display, etc.). Each content type is flexibly configurable, further consisting of user-defined fields, which in some implementations, correspond to a JSON type (e.g. string, number, object, boolean, array). Examples of user-defined fields include the following: text, number, date and time, location (coordinates), boolean, media (links to an asset), reference (links to an entry or object), array, JSON object. It will be appreciated that array fields can contain multiple values which can include strings, links to other entries or assets, etc. An array field may have an items property defining the allowed values in the array. Individual fields can also contain metadata, such as validations and widget appearance.

Individual items of content are stored in the CMS as entries (e.g. entry 204), which represent textual or structural information based on the content type used.

Items can also be assets (e.g. asset 210), which can include binary files (e.g. binary file 212), such as images, videos or documents, along with metadata. In some implementations, assets have the following fields: the name, description and attached file.

In summary, a content project contains all the content that is functional to one project, and an environment is a way to express one version of one project. An example use case for multiple environments as part of a given content project would be a scenario in which there is a current version of one's website and a future holiday version of the website that is not in production yet, but being worked on. There can be a first environment that contains the content for the current version being actively served to customers, while in parallel work is proceeding on a second environment which is for the future holiday version to be released.

Further, content in a given environment of a content project consists of entries and assets, with each entry being of a user-defined type that specifies the fields of a given entry. Thus, each entry is a unit of content in the system of a type that is flexibly defined by the user and capable of being adapted to suit a given purpose.

For purposes of illustration, an example of a content model for a product catalogue might include content types for a category (identifying what product type), a brand (identifying who made the product), and a product (an item for sale that references a category and a brand). Further, the brand content type might consist of several fields, such as a company name, logo, description, electronic contact information (website, social media, email address), phone number, etc.

Entries can have link (or reference) fields which point to other entries or assets. An example use case for a restaurant might include the following: a restaurant linking to its menu (singular relationship), a menu linking to its specific menu items (plural relationship), each menu item linking to a photo (attachment), a restaurant linking to multiple photos (attachments). The content delivery API can be structured so that a single HTTP request retrieves the entire set of linked resources above, starting with the menu, in one request. A CDN can cache these requests to further speed up future requests. This is useful for consuming apps (and especially mobile apps) as it reduces the need for multiple concurrent connections or servicing of serially dependent requests, and reduces the latency for results to return.

Links also provide additional advantages in that relationships are clearly defined and validated by specific content type fields. Entry links can be validated by content type (e.g. only allow Menu Items for fields.menuItems). Asset links can be validated by file type. (e.g. only allow Images for fields.photo). Links on the Content Delivery API are resolved using the published entries and assets, while links on the Content Preview API will resolve using the draft entries and assets.

Throughout the present disclosure, reference is made to content types and content entries, the content entries being defined from, and having the type of, specific content types. Therefore, it will be appreciated that a description pertaining to a particular content type can also pertain to a content entry that is of that content type, and the terms can often be used interchangeably, though they are understood to be distinct entities as has been described.

Figure 3A:
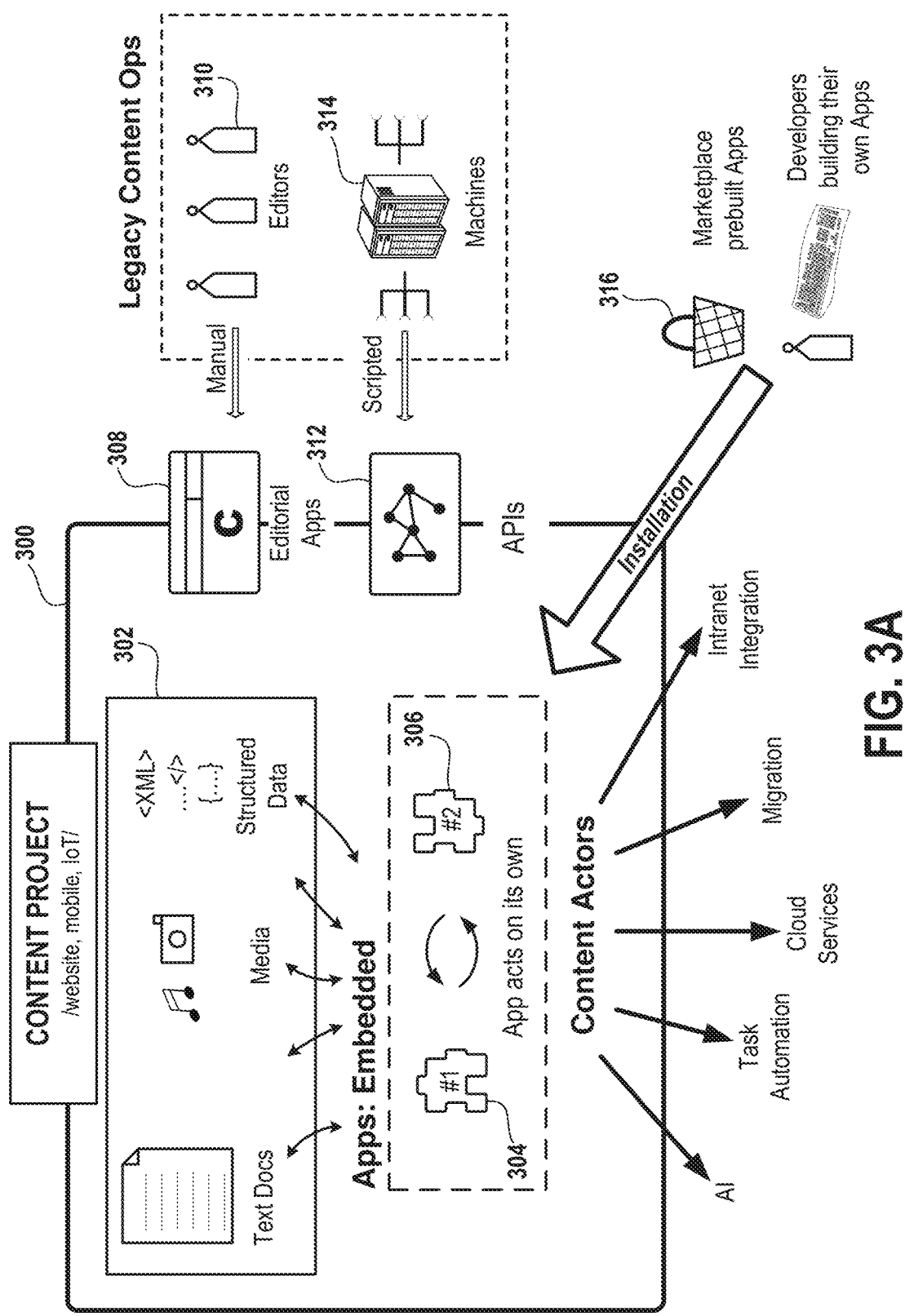
FIG. 3A conceptually illustrates a system for providing app functionality to extend the content management capabilities of a content management system, in accordance with implementations of the disclosure.

FIG. 3A conceptually illustrates a system for providing app functionality to extend the content management capabilities of a content management system, in accordance with implementations of the disclosure.

For purposes of the present disclosure, an app is a program or extension that extends the content management functionality of the CMS. APPs can provide non-native functionality enabling users to customize their editorial experience and management capabilities in the CMS. APPs can provide a way to enable external systems to participate in the process of writing or defining the structure of the content, which can include functions such as adding content itself, adding meta information like SEO, tagging, optimization, translation of text, etc. and such can be contributed in the CMS through applications for the work tailored to a specific user of the CMS. The CMS may have a stock content management application, such as web editor 112, and an application framework is provided to enable integration of APPs with the stock application.

Thus, there can be all manner of APP solutions for integrating or customizing content management (e.g. AI, asset management, etc.) and through the application framework, APPs can write information in the structures that the CMS maintains. It will be appreciated that such information will then be used when the webpage is built, whether at runtime or by another process, to present the right information to the consuming user. The result presented is an API which enables retrieval of the content used to compose the pages or experience that define the delivery channel.

In some implementations, the CMS provides content management tools, and provides an API that will be used to build the content delivery channel, such as a webpage. Thus, the CMS may not host or create the page, but provide the API target for queries to the CMS requesting the content for the page, such as for downloading the text, media files, the structure for the page, etc. By way of example without limitation, if an APP is used to edit a content structure such as a gallery, then the content retrieved will include the structure that was defined by the APP to manage the gallery, because the product of the APP's usage is a structure in the CMS. And the application to build the page will obtain through this API call all the data structures that are needed for the page, and because the structure for the gallery has been described by the APP that was installed, this structure will also be downloaded. Thus, the content for the webpage is authored in the CMS. But when a consumer user clicks on the webpage, there will be an application hosted in the website that is not the CMS, but this application for fetching the content will request content from the CMS. So the CMS acts like a database providing data for a website, but instead of a database, the CMS provides a much higher level API to deal with content for one's webpage or other delivery channel.

With continued reference to FIG. 3A, in general, APPs are installed or enabled for a given content project/space 300, or installed/enabled for an environment as a version of the content project. It will be appreciated that a given environment at any given moment in time has some version of content, and if an APP is installed in this environment, then it acts on this content.

In some implementations, a private APP can be built by a developer for a specific organization's needs to optimize the organization's editorial experience. Such a private APP is fully under control of the developer/organization and not accessible by other organizations. APPs are created within one's organization and installed into one or more environments, each with the ability to be individually configured.

In some implementations, there can be a marketplace 316 for APPs, with marketplace APPs being pre-built to connect the CMS with other systems, allowing CMS users to assemble the editorial stack of their choice. Marketplace APPs can be free to install or paid.

In the illustrated implementation, APPs can be installed for the content project 300. More specifically, in some implementations, APPs are installed for, and configured to act upon, an environment 302 containing items for a version of the content project 300.

Broadly speaking, an APP can include a front-end component (or widget) and/or a back-end component. In some implementations, the front-end component of an APP (or an APP declaring a front-end component and no back-end component) is referred to as a front-end APP, whereas the back-end component of an APP (or an APP declaring a back-end component and no front-end component) is referred to as a back-end APP.

An APP declaring a front-end or widget 308, provides a visual component that is added to an editorial application 308 of the CMS (e.g. web editor 112). As explained in further detail below, in some implementations, the front-end component uses a front-end SDK that implements a custom transport between custom code running in the browser and the APIs 312 of the CMS. Such front-end APPs can provide a visual addition/representation to the editorial interface, and act as editorial APPs, which can be accessed, operated, or viewed by editors 310 that utilize the editorial interface to manually edit the content of the content project 300.

APPs can also have a back-end component, which can be configured to run on its own by the vendor producing the APP. In the illustrated implementation, back-end APPs 304 and 306 are installed for the content project 300, and more specifically for the environment 302. In some implementations, back-end APPs can use a back-end SDK. However, back-end APPs can also call APIs directly. In some implementations, back-end APPs are hosted by 3rd party machines 314, and may make scripted API calls to the CMS.

In the case of front-end widgets, the use of the front-end SDK is required, because the web application editorial experiences are proprietary to the CMS. Thus, for allowance of the front-end to generate a rendering (e.g. table, window, dialogue, selector, etc.) inside of these CMS editorial applications, adherence to the transport is required. The front-end SDK provides the implementation of the transport that makes it simpler and more secure to insert these widgets or visual injections into editorial applications of the CMS. Widgets are intended to be consumed by a user—e.g. click button, select/instruct something, etc.

Back-end APPs 304 and 306 can function as embedded actors acting on their own inside of the content project. A back-end SDK can provide convenience features for APPs acting on their own, without supervision. By way of example without limitation, back-end APPs may act on their own, such as by reacting to some changes in the same or different systems, performing activities on a schedule, etc.

APPs are further defined as agents having identities in the system, and are thus content actors enabling integration of services and custom logic, such as artificial intelligence (AI), task automation, cloud services, migration, intranet integration, etc.

Figure 3B:
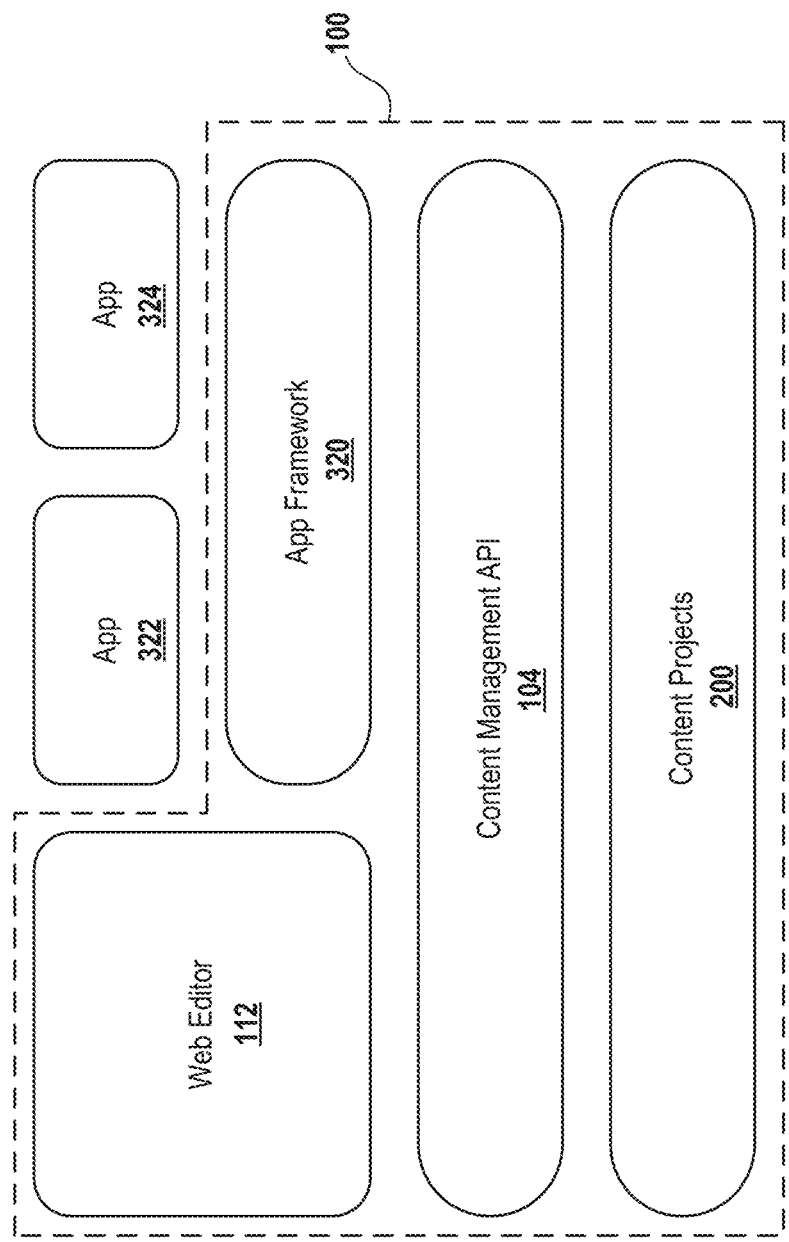
FIG. 3B conceptually illustrates an application framework for installation of APPs to interact with a CMS, in accordance with implementations of the disclosure.

FIG. 3B conceptually illustrates an application framework for installation of APPs to interact with a CMS, in accordance with implementations of the disclosure.

As shown, the CMS 100 stores content projects 200 and enables management of these content projects via a content management API 104. The web editor 112 is provided by the CMS 100, which accesses the content management API 104 to provide editorial capabilities to a user. In accordance with implementations of the disclosure, an APP framework 320 is provided, through which APPs 322 and 324 are enabled to interact with the CMS 100, including interacting with the web editor 112 and the content management API 104.

Figure 4:
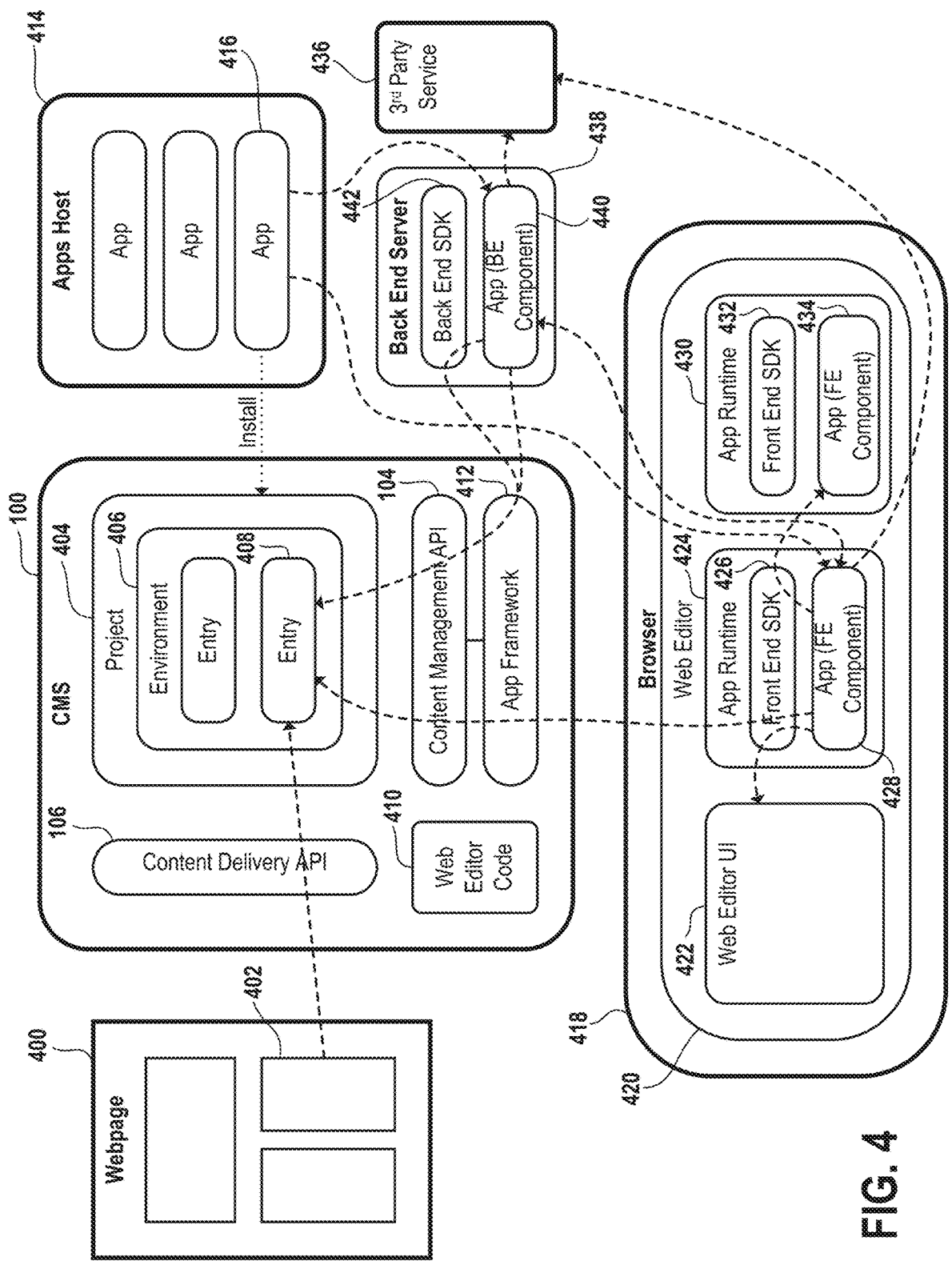
FIG. 4 conceptually illustrates front-end and back-end components of an APP interacting with a CMS 100, in accordance with implementations of the disclosure.

FIG. 4 conceptually illustrates front-end and back-end components of an APP interacting with a CMS 100, in accordance with implementations of the disclosure.

In the illustrated implementation, the CMS includes a content project 404, which contains an environment 406 having content entries such as entry 408. The CMS includes web editor code 410 that is deployed for execution in a client browser 418, that itself executes on a remote client device. The execution of the web editor code in the browser 418 instantiates the web editor 420. The web editor 420 presents a web editor user interface (UI) 422 to the user. The user is able to create, access, and edit content of the content project 404 using the web editor 420. It will be appreciated that the web editor 420 makes API calls to the content management API 104 to effect editorial changes in the content project 404, such as to entry 408.

An APP 416 is hosted by an APPs host 414. In some implementations, the APPs host 414 is part of the CMS 100. Whereas in other implementations the APPs host 414 is a 3rd party hosting location for one or more APPs. The APP 416 is configured to extend the functionality of the web editor 420.

As shown, the APP 416 includes a front-end component 428 that is deployed to execute within an APP runtime environment 424. The APP runtime environment 424 is instantiated by the web editor 420 and provides a controlled environment in which to deploy and run the front-end component 428. A front-end SDK 426 is loaded with the front-end component 428, providing a custom transport to enable the front-end component 428 to access the content management API 104 to effect editorial changes to the content of the content project 404, such as editing entry 408. It will be appreciated that the front-end component 428 may further communicate with (e.g. via HTTP calls) a 3rd party service 436, thereby enabling integration of functionality provided by the 3rd party service 436. In some implementations, the 3rd party service 436 is a service included in the CMS 100.

The front-end SDK enables loose coupling of front-end APPs to the CMS editorial application, in this case the web editor 420. With the front-end SDK, the front-end component 428 can access all of the data structures that are maintained and stored in the environment 406. The set of durable content and settings and media, grouped in the environment 406, is the target for the installation of APPs. And thus APPs built with the SDK can access all of the documents, media, and relevant entities within the environment. For example, an APP might react to some changes in content and perform further changes using the SDK. It will be appreciated that a developer can write an APP once, then make it available for installation across other environments or content projects.

The front-end SDK provides the mechanism to isolate the CMS editorial application, so that its code does not need to meld with another code base of an extension at runtime. Rather, the front-end SDK provides a means of encapsulation, protecting the CMS web editor from other small systems being embedded inside. It acts as a transport mechanism between the custom code and the platform on which the code runs. A great variety of custom logic integration possibilities can be enabled (e.g. AI, migration, cloud connectors, etc.). One can use any custom logic or connection and using the SDK can communicate with the content container which is the environment of the content project.

The installation configuration is such that an APP is packaged but is not a part of the CMS offering space. Rather, an APP is simply a package that is ready to be installed. And with a single API call, code is made available in a content project/environment, so that the process is completely automatic and APPs are very loosely coupled to the CMS. Non-native APPs can operate, but cannot influence the system too much and cannot break the system. And if one decides that they do not wish to use a particular APP, they can simply uninstall it.

As noted, the front-end SDK helps to achieve a loose coupling of front-end components of APPs to the CMS editorial application. Broadly speaking, allowing for the installation of custom front end widgets in the web editor 420 running in the browser 418 environment can expose the web editor 420 to potentially harmful or malicious actions. Thus, to achieve a good sandbox that insulates the web editor 420, the front-end component 428 is run in a separate APP runtime environment 424, which creates a boundary between the front-end component 428 and the web editor 420. The front-end SDK 426 thus provides a transport mechanism that can cross this boundary. The front-end SDK 426 can be used to communicate between APP code which may not be fully trusted, and the CMS editorial application platform on which the APP code will run. The front-end SDK 426 can also provide convenience methods for performing relevant API calls to perform content management activities. And further, the front-end SDK 426 can include convenience methods for visual actions or how to present information to users (e.g. opening a dialogue window from an editorial widget, etc.).

The front-end SDK 426 provides the custom transport by which the front-end component 428 communicates with the CMS 100. The front-end SDK 426 also governs interaction of the front-end component 428 with the web editor 420, and any other installed APPs. In the illustrated implementation, a second front-end component 434 of another APP is also deployed to run in its own APP runtime environment 430, also loaded with the front-end SDK 432. The front-end component 428 accesses the front-end SDK 426 in order to communicate with the front-end component 434, and thus interactions between front-end components of APPs loaded in the web editor 420 are subject to control via the controlled APP runtime environments and the front-end SDK.

Front-end APPs can provide a customized user interface with controls or dashboards within the web editor UI 422. In addition to such front-end facing features, APPs can also be configured to have back-end componentry that may perform asynchronous work on a server without any user interaction. In the illustrated implementation of FIG. 4, the APP 416 further includes a back-end component 440 that is run on a back-end server 438, which can be a 3rd party server or a server that is part of the CMS 100. In the case of 3rd party server execution, such back-end APPs can be fully under control by the 3rd part. And with APP identities and events, back-end APPs can interact with the content management API 104 with their own identity. Back-end APPs can individually subscribe to events within their installed environment, in a manner similar to webhooks. However, an advantage of backend APPs compared to using regular webhooks and content management API tokens is that APP identities are not user bound and therefore not restricted to a specific user account's permissions. Also, the frontend and backend configuration is provided as a bundle and can be automatically installed into an environment with a single click without manual setup of webhooks filters or updating back-end code for new environments.

A back-end SDK 442 is provided, which can be utilized by the back-end component 440 to simplify calls to the content management API 104. The back-end component 440 may also communicate with the 3rd party service 436.

It will be appreciated that content is delivered via the content delivery API 106. For example, in the illustrated implementation, a webpage 400 is configured to obtain content from the CMS 100. The webpage 400 includes a content section 402 in which the entry 408 is presented, the entry 408 being obtained by accessing the content delivery API 106. The changes to content entries, facilitated by APPs including front-end and back-end components, are reflected in content that is retrieved and eventually presented through a delivery channel such as the webpage 400.

Figure 5:
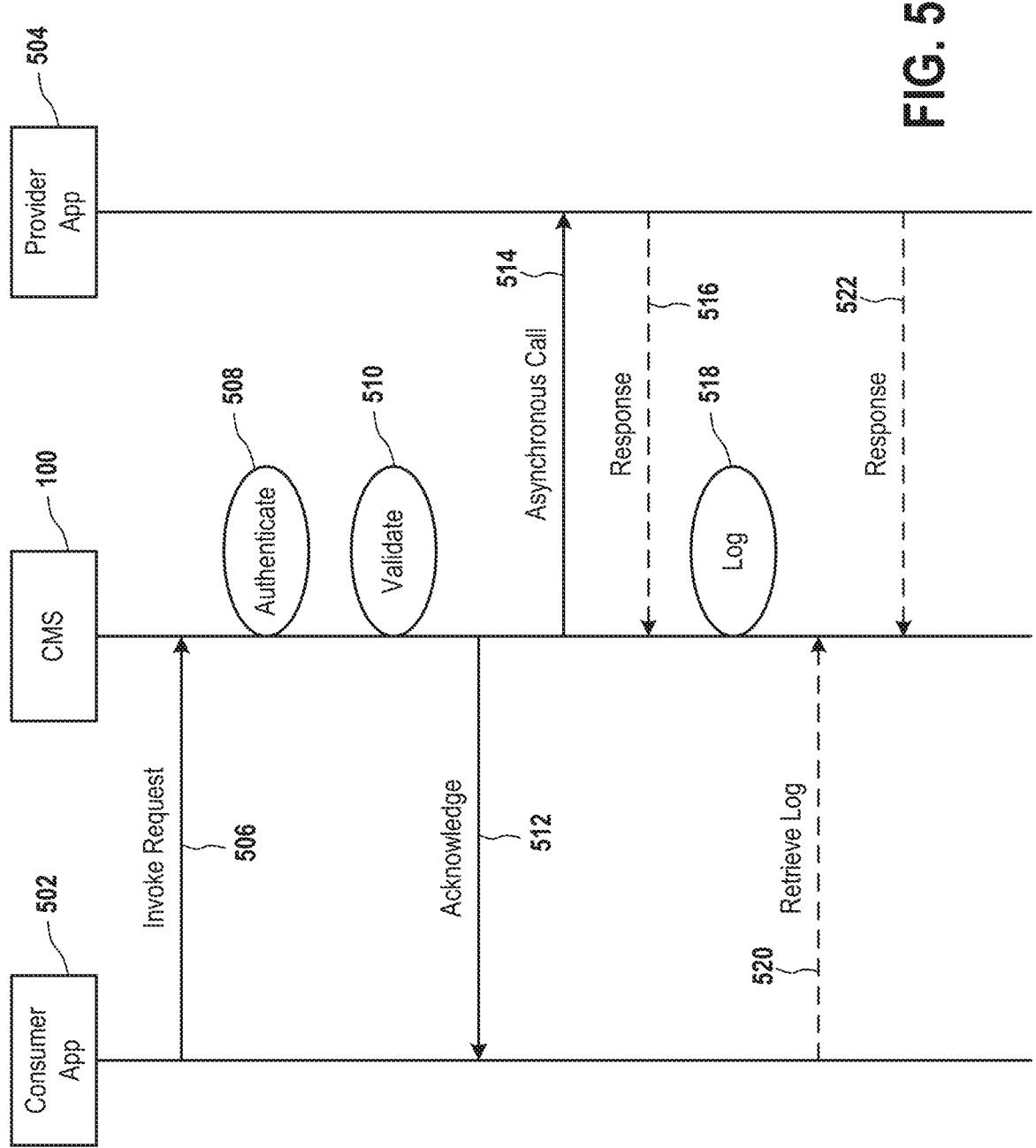
FIG. 5 conceptually illustrates communications in a system in which an app of a CMS triggers an action by another app, in accordance with implementations of the disclosure.

FIG. 5 conceptually illustrates communications in a system in which an app of a CMS triggers an action by another app, in accordance with implementations of the disclosure.

In the illustrated implementation, a "consumer" app 502 is an app configured to trigger behaviors of another app, which is the "provider" app 504. The provider app 504 exposes actions that other apps can trigger.

The consumer app 502 issues an invoke request 506 to the CMS, requesting to trigger an action that is exposed by the provider app 504. Upon receipt of the invoke request 506, the CMS 100 proceeds to authenticate/authorize the request (reference 508), ensuring that the consumer app 502 is authorized to make such a request. The invoke request 506 is also validated (reference 510) by the CMS 100 to ensure that the contents of the invoke request 506 adhere to any requirements defined by the provider app 504 for making a valid request of an available action.

If the invoke request 506 is successfully authenticated/authorized and validated, then a successful acknowledge 512 is sent to the consumer app 502 indicating as such. Furthermore, an asynchronous call 514 is generated from the CMS 100 to the provider app 504. The asynchronous call 514 is generated to a predefined location endpoint as defined by the provider app 504. The asynchronous call 514 is performed in a fire-and-forget manner such that the CMS 100 does not wait for an acknowledgement or response to the call. This provides a security benefit so that if there is a problem with the provider app 504 or its host system, then the CMS 100 will not be affected.

While the CMS does not wait for a response, in some implementations, the provider app 504 may send a response 516 to the CMS, which may be logged by the CMS 518. For example, the response 516 may indicate successful receipt of the asynchronous call 514. Accordingly in some implementations, the consumer app 502 may retrieve or access the logged information to obtain the status of its request.

It will be appreciated that the result of the asynchronous call 514 is for the provider app 504 to perform some action which it has made available for triggering by the consumer app 502. In some implementations, the action is performed by the provider app without feedback to the CMS. In other implementations, the provider app 504 may perform an action resulting in, or including, a response 522 that is returned to the CMS, which may also be made available to the consumer app 502 via the CMS.

It will be appreciated that from the consumer app 502 developer perspective, they are interested in triggering a specific action on another app installed in the same content project (e.g. content space or environment). By configuring the CMS 100 as an intermediary to facilitate inter-app action triggering, the consumer app developer does not need to know where the provider app is hosted, nor do they need to share any signing secrets with the provider app 504.

From the provider app 504 developer perspective, then to facilitate such a system, a set of actions is declared that will be exposed to other apps. The provider app developer may be interested in knowing the CMS context around the caller (e.g. which user/app is calling their action). By implementing a framework that provides authorization/validation, then triggering actions between apps in the framework is easier and more secure.

Figure 6:
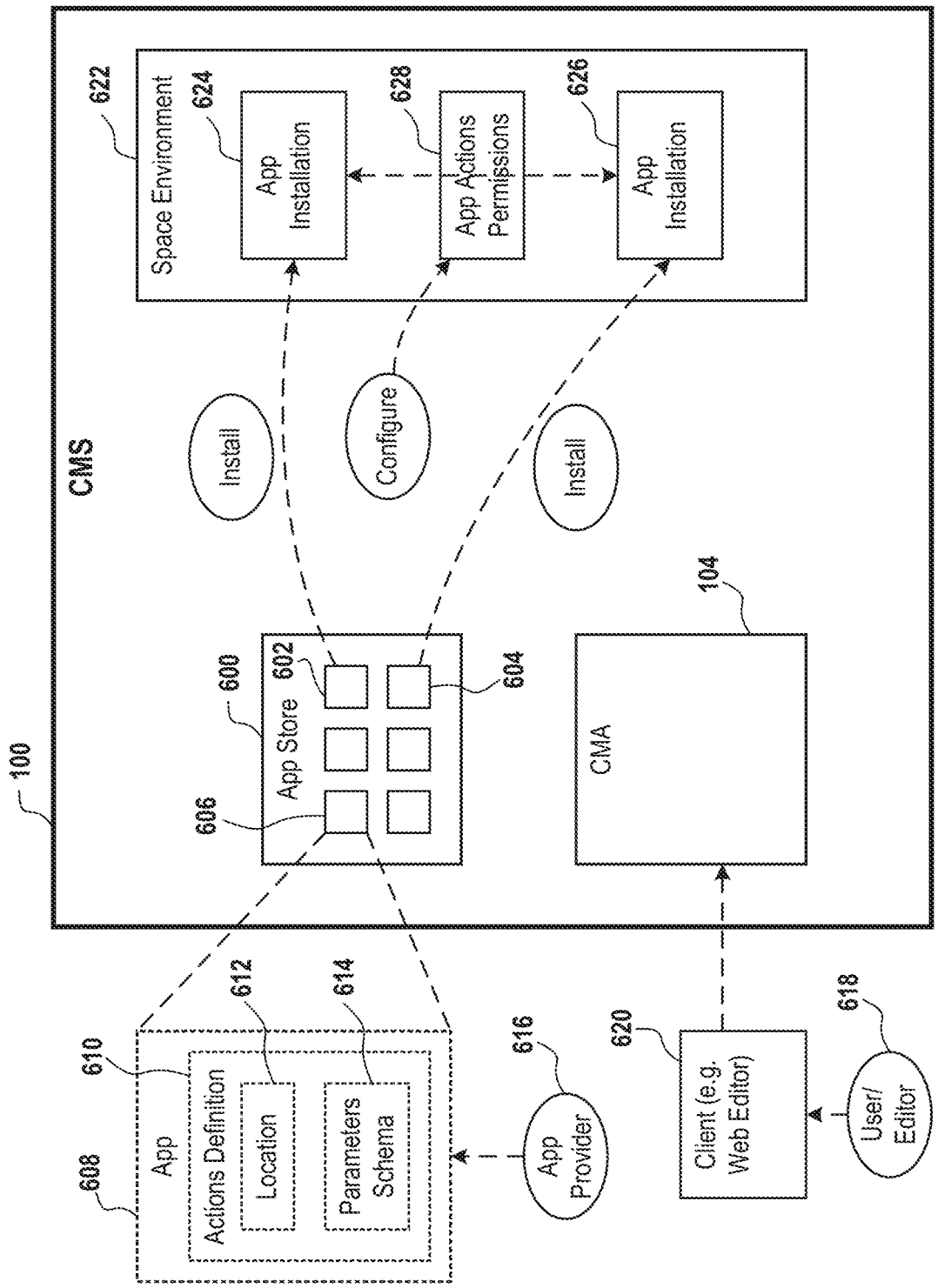
FIG. 6 conceptually illustrates installation and configuration of apps to enable app actions to be invoked between apps in a content project, in accordance with implementations of the disclosure.

FIG. 6 conceptually illustrates installation and configuration of apps to enable app actions to be invoked between apps in a content project, in accordance with implementations of the disclosure.

In the CMS 100, an app store 600 is provided, from which apps can be selected for installation into a content project in order to extend the editing functionality provided for the content project. For example, in the illustrated implementation, the app store 600 includes representative apps 602, 604 and 606. A user 618 accessing the CMS 100 using a client 620 (e.g. web editor application) is able to select apps 602 and 604 in the illustrated implementation, and install apps 602 and 604 into their space environment 622, which may define a version of their content project in the CMS 100.

An app provider (e.g. a developer of an app) that provides an app made available through the app store 600, may define actions of the app which are exposed for calling from other apps. For example, in the illustrated implementation, the app 606 is provided to the app store 600 by the app provider 616. Shown in expanded view at reference 608, the app 606 further has an action definition 610, which defines an action of the app 606 that is available for calling by other apps as well as the requirements for calling the action. For example, a location 612 defines where a call should be placed in order to initiate the exposed action of the app. By way of example without limitation, in some implementations the location may be defined by an address/endpoint such as a URL of an HTTP address/endpoint. A parameters schema 614 defines what parameters are required or can be provided, and how (e.g. syntax), when calling the action. For example, the parameters schema may provide a listing of allowed headers in the request for the action.

In some implementations, the action definition 610 includes a categorization/type, which can be configured to enable standardization of parameter requirements for the given app action being defined. That is, various categories can be predefined for use in the actions definition, with each category have a predefined parameters schema associated thereto. Thus, assignment of a particular category to an app action definition standardizes the parameters schema for that app action, in accordance with the predefined parameters schema that is associated to the assigned category.

With continued reference to FIG. 6, installation of the app 602 into the space environment 622 defines an app installation 624 which identifies the app 602 as being enabled for use in the space environment 622. Similarly, installation of the app 604 into the space environment 622 defines an app installation 626 which identifies the app 604 as being enabled for use in the space environment 622. After installation of apps into the space environment 622, the user 618 may configure the apps for triggering actions between each other, defining permissions regarding which app may trigger which action of another app. More specifically, a set of app actions permissions 628 are defined and configured for the space environment 622. In the illustrated implementation, the app actions permissions 628 are configurable to set which of the app 604's available actions are permitted to be triggered by the app 602, and which of the app 602's available actions are permitted to be triggered by the app 604.

App actions can be configured to be not permitted by default. That is, when an app is installed, then it is only enabled to trigger an available action of another installed app if the user explicitly sets the permission to allow the app to trigger the action. Furthermore, it is noted that an installed app may only trigger actions of another installed app in the same content project, such as in the same space environment 622 in the illustrated implementation. Thus, within the context of the space environment 622 in the illustrated implementation, the app 602 can be configured to trigger an available action of the app 604, but not of the app 606 because the app 606 is not installed in the same space environment 622. Thus, the scope of triggering of app actions can be automatically limited to the same space environment.

Figure 7:
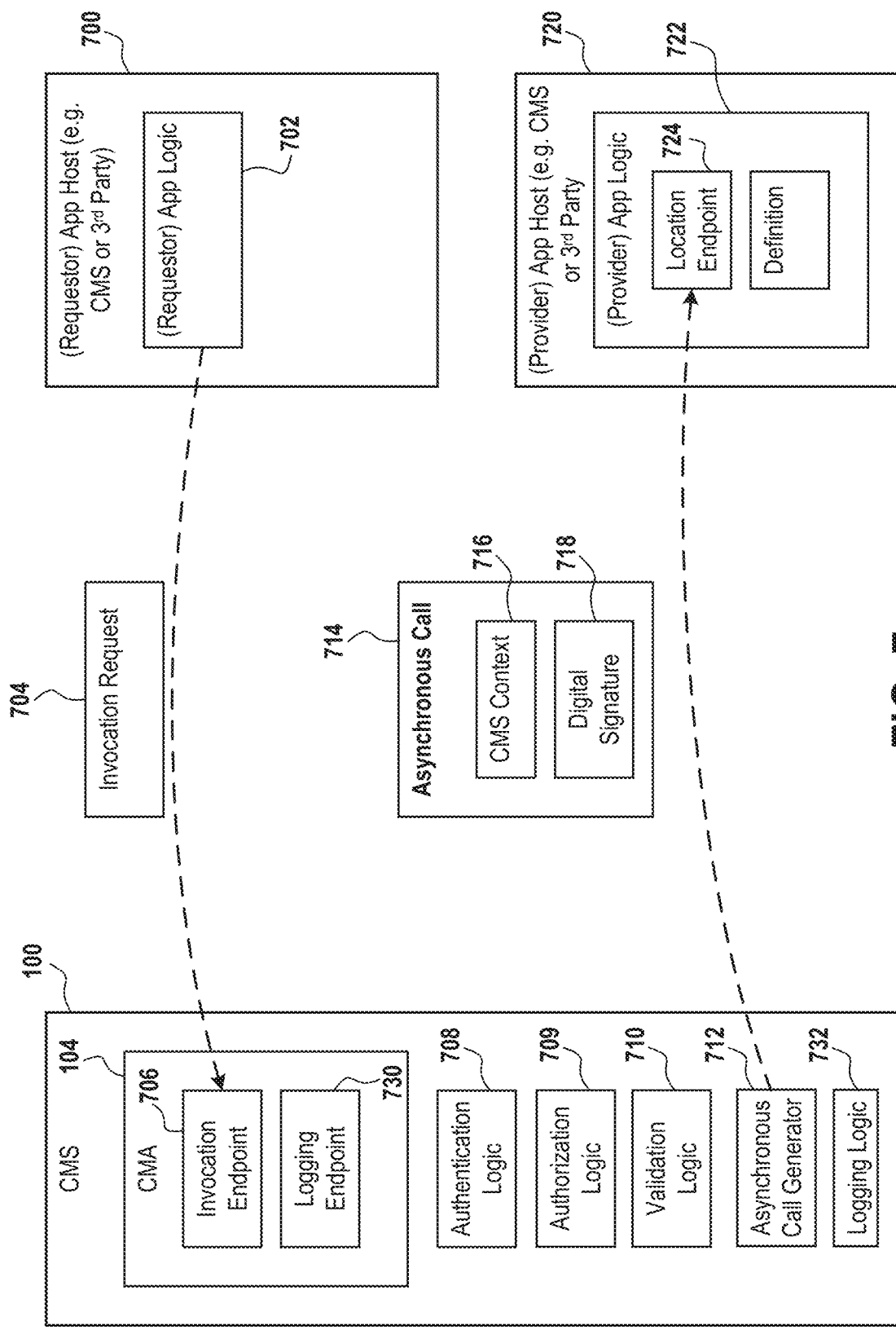
FIG. 7 conceptually illustrates triggering of an app action by another app in a content project, in accordance with implementations of the disclosure.

FIG. 7 conceptually illustrates triggering of an app action by another app in a content project, in accordance with implementations of the disclosure.

It will be appreciated that for an installed app as has been described, the functional application logic of the installed app may be remotely hosted by a 3rd party in some implementations, or may be hosted by the CMS in other implementations. For example, in the illustrated implementation, the app logic 702 can be the functional application logic of the app 602 described above with reference to FIG. 6. The app logic 702 as shown is hosted by an app host 700, which in some implementations may be a 3rd party host or a hosting system that is part of the CMS. Similarly, the app logic 722, hosted by an app host 720, can be the functional application logic of the app 604 described above.

In the illustrated implementation, triggering of an app action is conceptually shown. More specifically, the (provider) app 604 exposes an action callable to be performed by its corresponding (provider) app logic 722, and the (consumer) app 602 triggers this action via its corresponding (consumer) app logic 702. In order to trigger the app action, the app logic 702 generates an invocation request 704, which in some implementations, is a call to an invocation endpoint 706 of an API of the CMS 100, such as the CMA 104. Upon receipt, the invocation request is authenticated, checked for authorization, and validated.

First, authentication logic 708 of the CMS authenticates the app logic 702 on the CMS. This can entail authenticating the consumer app logic 702 and its invocation request 704 based on a cryptographic authentication method, such as a token authentication method or shared secret based authentication method. Authorization logic 709 checks the app actions permissions 628 for the space environment 622 to determine whether the app 602 is authorized to request the particular app action being requested. It will be appreciated that this authorization is user-defined for the particular space environment 622, so that even if the app 602 successfully authenticates to the CMS, the app 602 still cannot invoke an action by another app unless specifically authorized to do so in the context of the space environment 622. If the authentication or the authorization fails, then an error message can be surfaced to the user indicating the reason for the failure.

Upon successful authentication and authorization, then validation logic 710 of the CMS determines whether the parameters of the invocation request adhere to the requirements of the provider app for triggering the action. That is, the validation logic 710 checks parameters of the invocation request against the parameters schema defined for the app 604 in its actions definition as described above, and determines whether such parameters are consistent with the requirements therein defined. In some implementations, the validation process includes validating body and headers. If validation fails, then an error message can be surfaced to the user indicating the reason for the failure. It will be appreciated that by validating at the CMS level, early feedback can be provided to the consumer app when the request cannot be processed due to client-side errors, and this also frees the downstream provider app from having to deal with non-conforming requests for its actions.

Upon successful authentication/authorization and validation of the invocation request 704, then asynchronous call generator 712 generates an asynchronous call 714 to a location endpoint 724 of the (provider) app logic 722, as specified by the app's action definition. The asynchronous call 714 includes parameters 716, which can include the CMS-related context of the call, such as the space, environment, and identity of the consumer app making the call, as well as other parameters relevant or required for the requested action. In some implementations, the asynchronous call 714 is digitally signed with a digital signature 718 for security.

Because requests are digitally signed by the CMS, the (provider) app logic 722 can verify the legitimacy of an incoming request.

In some implementations, the asynchronous call generator 712 operates a queue in which authenticated/authorized and validated invocation requests are queued for handling. And upon retrieval of a request from the queue, then the asynchronous call generator 712 generates the appropriate digitally signed call for the requested app action.

In some implementations, as noted, a response from the (provider) app logic 722 can be provided to the CMS, which can be logged by logging logic 732. To access the log of such responses, for example to ascertain the status of a prior request, a logging endpoint 730 of the CMA can be accessed, which may access the logging logic 732 to retrieve the relevant results.

It will be appreciated that the asynchronous call is made in a fire-and-forget manner, wherein the CMS does not wait for a response to the call from the provider app logic 722. Thus, if the app that is the action provider is down or encountering problems, then the CMS is not affected. The asynchronous nature of the app actions system thus provides for independence of the apps from one another, shielding them from potential harmful effects. Also, the validation of the initial request from the consumer app is performed by the CMS, and as the CMS is verifying the appropriateness of the request and then generating the call, the provider app should not be receiving any non-conforming or invalid calls.

Figure 8:
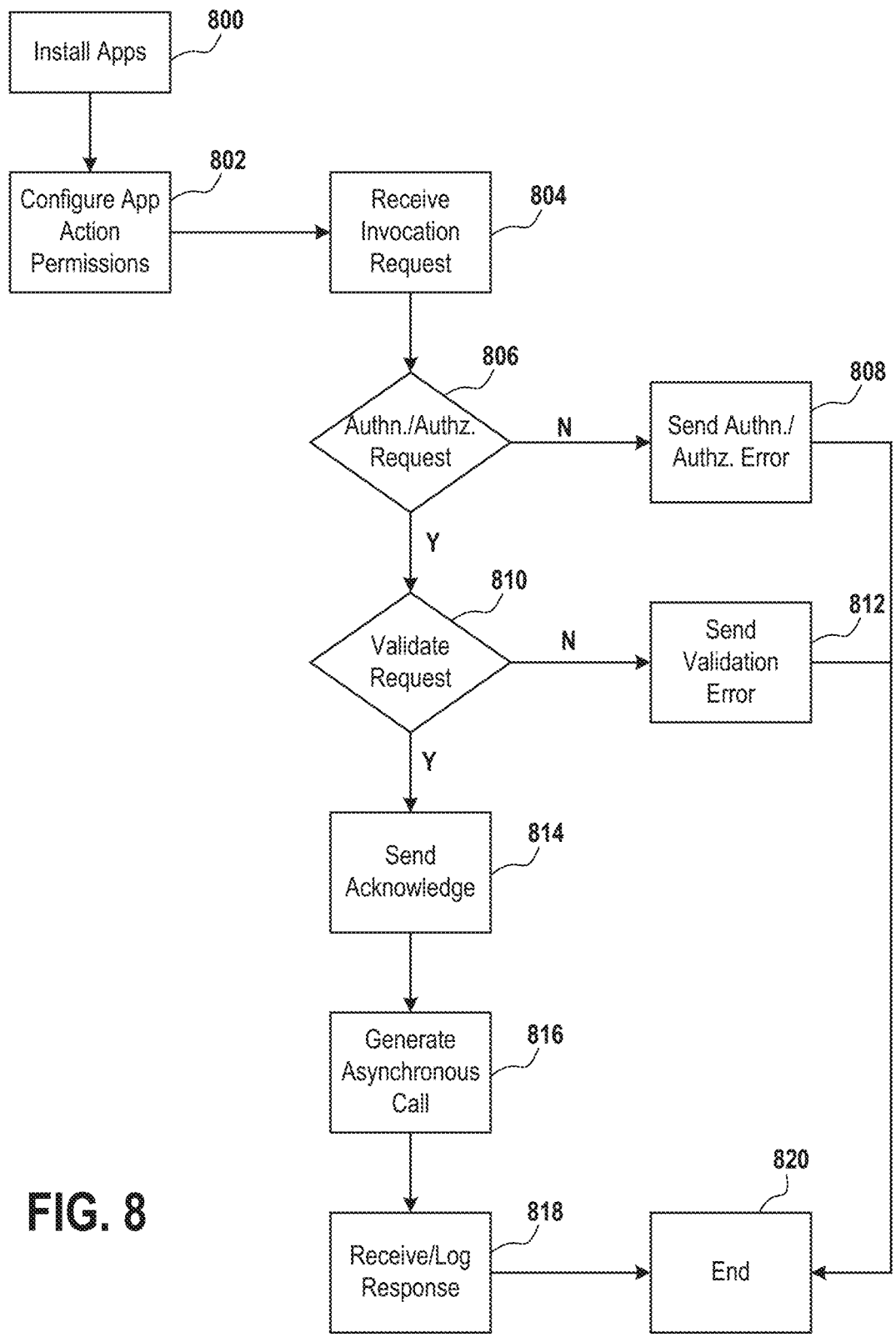
FIG. 8 illustrates a method for enabling actions to be triggered between apps installed in a content project of a CMS, in accordance with implementations of the disclosure.

FIG. 8 illustrates a method for enabling actions to be triggered between apps installed in a content project of a CMS, in accordance with implementations of the disclosure.

At method operation 800, a plurality of apps are installed in a content project, such as a content space, or more specifically a particular environment of a content space. Installation of the apps enables the functionality of the apps to be used to extend the editing capabilities of an editing application when used to edit the content of the content project. The plurality of apps include at least a first (provider) app that exposes an action that is available to be called, and a second (consumer) app which can be configured to call the exposed action.

At method operation 802, app action permissions are configured, which define which apps can call which actions exposed by other apps. For a given app, available actions of other installed apps in the same content project can be presented through a user interface, and the user can thereby configure which actions to allow the app to invoke. In the present case, the app action permissions of the second app are configured to allow the second app to invoke the action exposed by the first app.

At method operation 804, an invocation request is received from the second app at the CMS. The invocation request from the second app is configured to request to invoke the action of the first app, and as such, the invocation request may include relevant parameters for invoking the action.

At method operation 806, the CMS authenticates/authorizes the request, determining whether the second app is authorized to request the action of the first app. If not, then at method operation 808 an authentication/authorization error is returned and the method ends 820.

If the invocation request is successfully authenticated/authorized, then at method operation 810 the CMS validates the request, determining whether parameters included in the request adhere to the requirements for the action sought to be invoked by the invocation request. If the validation fails, then at method operation 812 a validation error message is returned and the method ends 820.

If validation is successful, then at method operation 814, an acknowledgement message is returned, indicating that the request was successfully validated or processed by the CMS. At method operation 816, the CMS generates an asynchronous call to the first app to activate the action exposed by the first app. The asynchronous call is performed in fire-and-forget manner, so that the CMS does not wait for a response to the call, and the CMS is not affected if the first app encounters any issues or is unresponsive.

Optionally, at method operation 818, the CMS may receive and log a response received from the first app. In some implementations, the CMS may expose the logged response to be retrieved/read by the first app.

At method operation 820, the method ends.

It will be appreciated that implementation of the present systems and methods for providing app actions triggering between apps in a CMS provides several security benefits for the various parties interacting with the CMS and the CMS itself.

From the perspective of the action provider (the app whose action is triggerable), an endpoint that they register and expose as an available app action will receive signed requests from the CMS. Because the requests from the CMS are signed and identifiable, other requests that may be received at the endpoint can be discarded, or separately handled as desired by the action provider. Further, to issue an app action, a request to an API of the CMS (e.g. CMA) needs to be performed, and such requests are subject to rate limiting implemented by the CMS. Accordingly, actors interfacing with the CMS cannot perform denial-of-service attacks on endpoints exposed as app actions. Also, because actors interfacing with the CMS are authenticated, unauthenticated actors cannot issue app actions. In some implementations, a shared secret based authentication scheme is employed by the CMS, and thus, 3rd party actors need only share secrets with the CMS, and there is no sharing of secrets between 3rd parties directly. Again, from the action provider perspective, security is enhanced as the action provider can expose an action for calling by a consumer app, without needing to share a signing secret with the consumer app.

From the perspective of the action consumer (the app that requests to invoke an action of another app), only actions present on apps installed in the same content project (e.g. same space environment) are available. Furthermore, in some implementations, only users are able to list available app actions in a given content project, e.g. via user tokens. Thus, for example, backend apps are not able to list available app actions, whereas such a list is available to a user of the web editor or through a front-end app (e.g. to list actions in the front-end UI).

And from the perspective of the CMS, actors interfacing with the CMS cannot harm other actors interfacing with the CMS, as requests for app actions are filtered and validated by the CMA. Furthermore, harmful or faulty app action providers will not affect the CMS or other users as actions are executed asynchronously in a sandboxed environment.

Figure 9A:
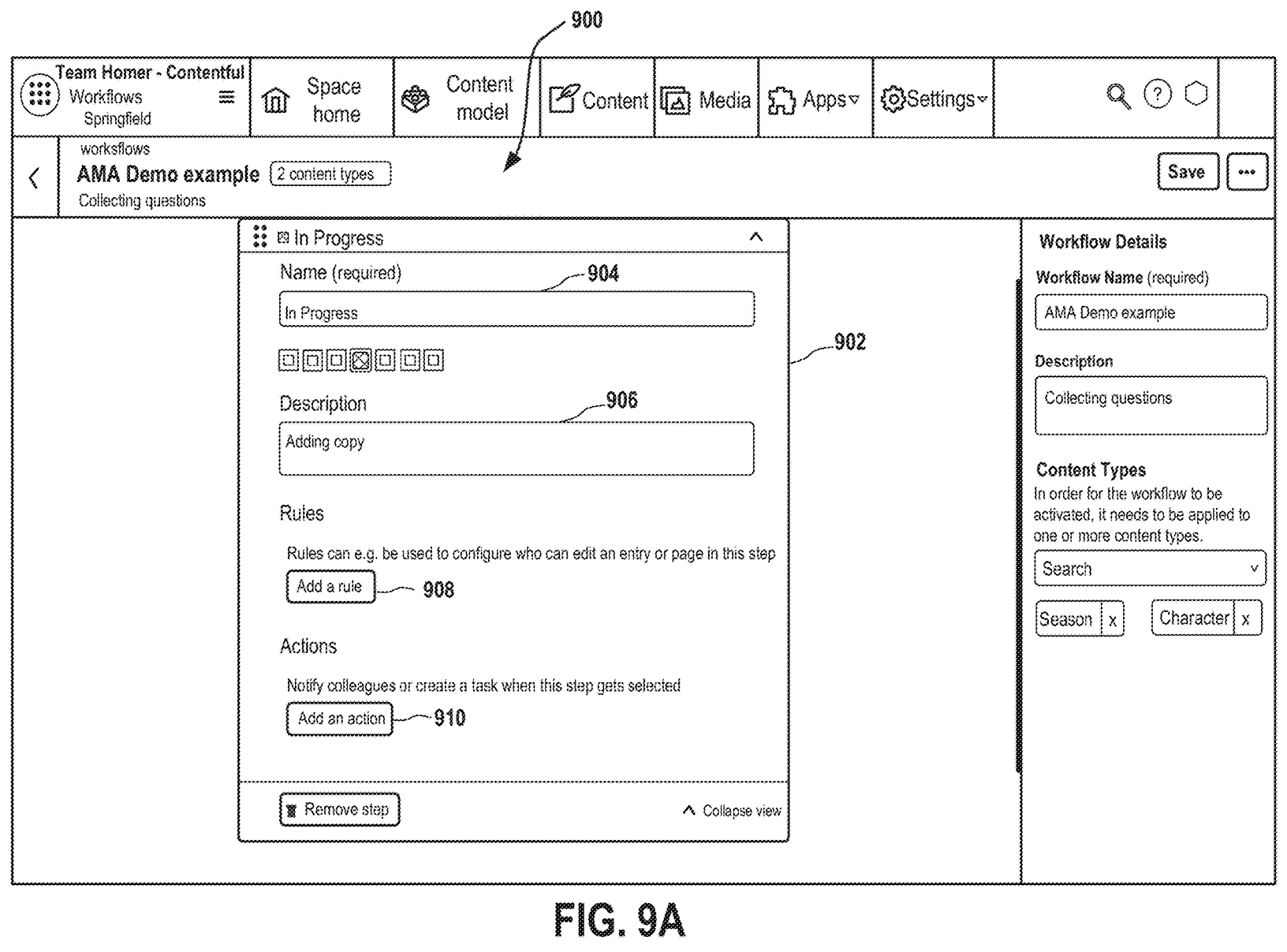

FIG. 9A illustrates an example of an interface for an app in a CMS, in accordance with implementations of the disclosure.

In the illustrated implementation, an interface 900 for the "Workflows" app on the Contentful® CMS platform is shown. The interface 900 is accessed from a web editor of the CMS, and extends the editing functionality of the system. More specifically, in the window 902 of the interface 900, interface elements are shown for editing a workflow state named "In Progress." For example, in the field 904, the name of the workflow state is editable. In the field 906, a description of the workflow state is editable. A button 908 is configured to enable addition of a rule or configuration for the workflow state.

Additionally, a button 910 is configured to enable addition of an action to the workflow state. That is, when the workflow state is set for a particular content entry, then the defined action will be triggered.

Figure 9B:
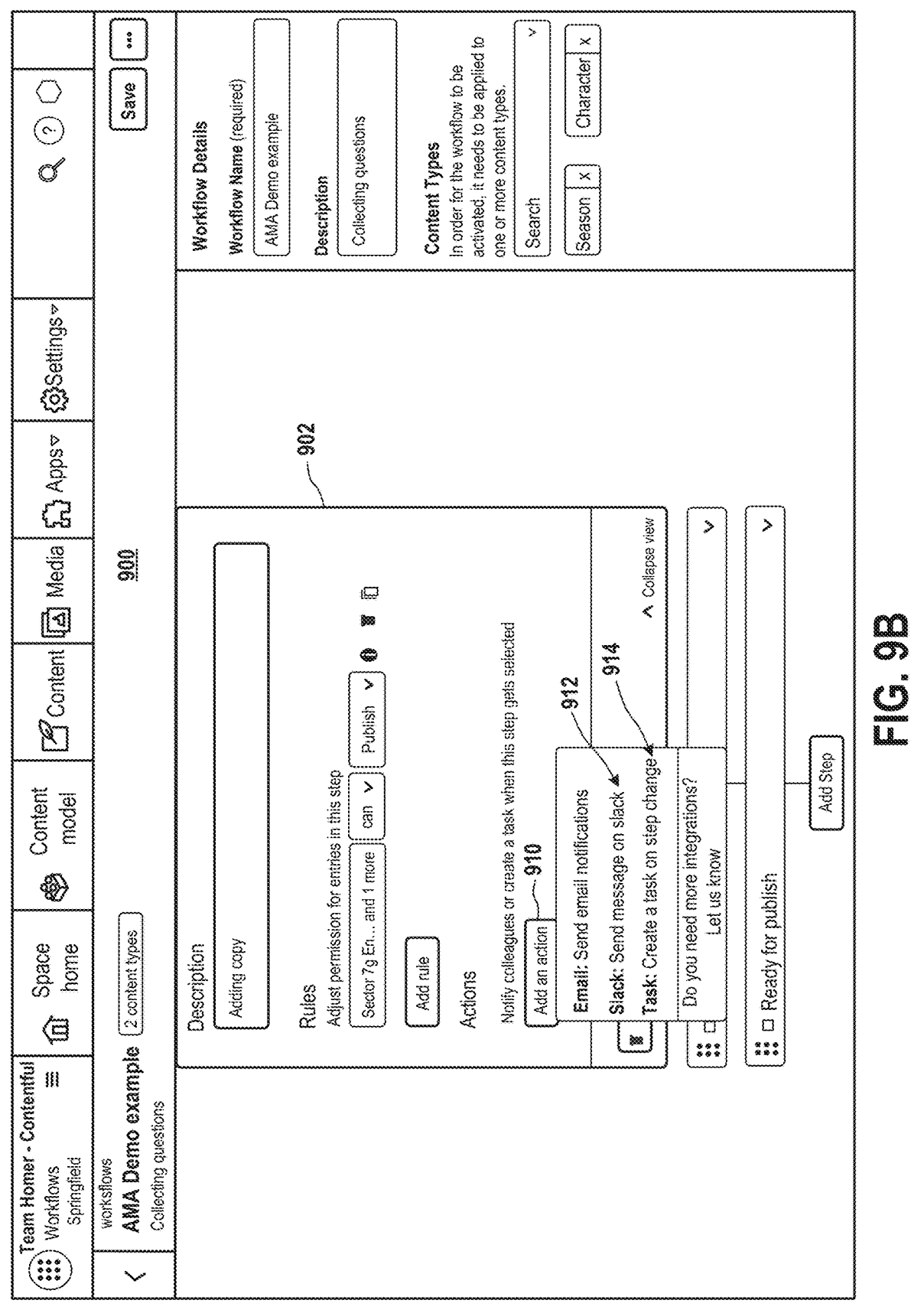

FIG. 9B illustrates the interface for an app in a CMS, in accordance with the implementation of FIG. 9A.

In the illustrated implementation, in the window 902 of the interface 900, selection of the button 910 reveals selectable options to add specific actions to be triggered by assignment of the workflow state (the "In Progress" workflow state as shown at FIG. 9A). For example, a selectable option 912 enables sending a message via a "Slack" app, and a selectable option 914 enables creating a task on a "Task" app.

Figure 9C:
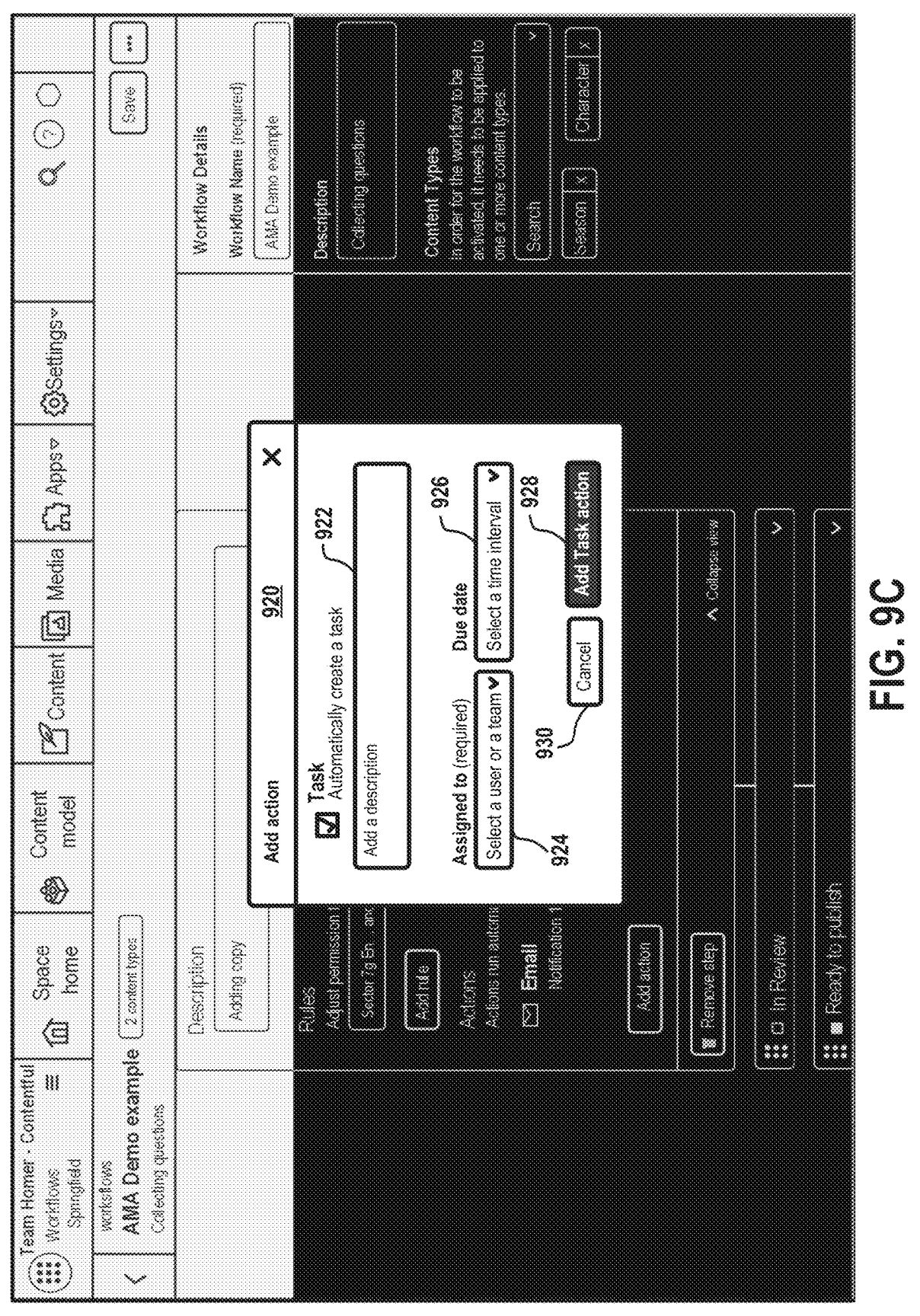

FIG. 9C illustrates the interface for an app in a CMS, in accordance with the implementation of FIG. 9B.

In the illustrated implementation, a pop-up window 920 is provided in response to selection of the selectable option 914 shown at FIG. 9B. With continued reference to FIG. 9C, the pop-up window 920 enables editing of an action to be performed by the "Task" app, namely creation of a task item. As shown, a field 922 is provided for editing the description of the task. A field 924 enables selection of a user for assignment of the task. A due date selector 926 enables selection of a due date time interval. A button 928 enables addition of the "Task" app action to the workflow state, whereas a button 930 enables canceling the activity so that no action is added.

Figure 9D:
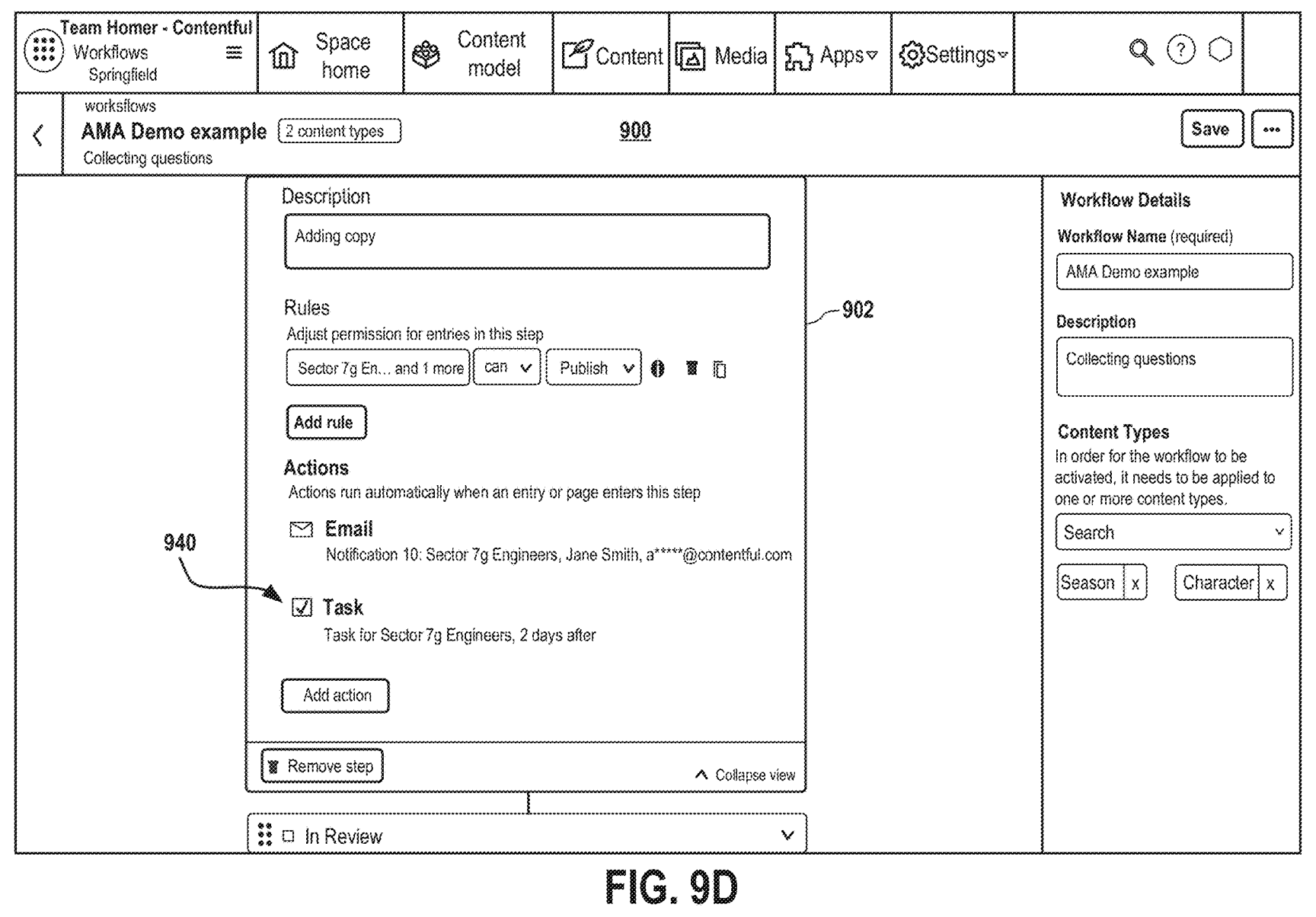

FIG. 9D illustrates the interface for an app in a CMS, in accordance with the implementation of FIG. 9C.

Following addition of an action via the pop-up window 920 of FIG. 9C, an action 940 to be performed by the "Task" app is now shown in the window 902 at FIG. 9D. The illustrated action 940 will be triggered and performed when the "In Progress" workflow state is set for a given content entry. In this manner, the "Workflows" app is configured to trigger an action by the "Task" app.

As another example, as noted above the selectable option 912 enables sending a message on Slack. Selection of the selectable option 912 may thus cause opening of an interface to enable setting parameters of a message to be triggered through a "Slack" app, such as the recipient channel, message contents, etc. In this manner, the "Workflows" app can be configured to trigger an action by the "Slack" app.

It will be appreciated that the foregoing are merely some example implementations of an app of a CMS being configured to trigger an action exposed by another app, and many other types of apps and app actions can be configured in accordance with implementations of the disclosure. Automations can be implemented by configuring one app to automatically trigger an action of another app upon the occurrence of some predefined condition. This can be useful for editors of content in a CMS to more seamlessly integrate different functions in relation to a given piece of content.

In some implementations, users can manually trigger actions exposed by apps. For example, when working within a given app, a user may be provided with an interface enabling manual triggering of an action exposed by another app.

Traditional content management systems were designed to store and present content elements like text, images and video on websites. That is, the traditional CMS approach is to manage content in one big bucket, i.e., content, images, HTML, CSS. Unfortunately, this made it impossible to reuse the content because it was commingled with code. As digital platforms have evolved, the need for more flexible solutions emerged. For instance, enterprises are now developing websites, mobile sites, apps, digital displays, conversational interfaces and more. Meanwhile, the traditional CMS organizes content in webpage-oriented frameworks, making it impossible for the same content to adapt to other digital platforms.

In some implementations, the content management system (CMS) of the described embodiments is a headless CMS. A headless CMS functions as a "content" repository, where the content is separated or decoupled from the presentation layer head. Because of this decoupling, the content is not page-based. As described above, aspects of the headless CMS described herein provide for editors that allow for efficient structuring of content. The structuring of content enables for efficient management of said content and access to said content using specialized application specific interface (API) calls.

In one embodiment, the content infrastructure includes APIs for content management (e.g., content management API), previewing (e.g., content preview API), images (e.g., images API), and display (e.g., content delivery API), to deliver content to any application, platform, form factor, device, IOT, and website.

The content delivery API (CDA) is a read-only API for delivering content from the CMA to apps, websites and other media. In one embodiment, content is delivered as JSON data, and images, videos and other media as files. In one embodiment, the CDA is available via a globally distributed content delivery network. By way of example, the server closest to the user serves all content, both JSON and binary. Serving from the closest server minimizes latency, which especially benefits mobile apps. In one embodiment, content of the CMS is hosted in multiple global data centers, which greatly improves the availability of content. In one configuration, the content management API (CMA) is a read-write API for managing content. Unlike the content delivery API, the content management API requires the user to be authenticated. In some embodiments, the CMA may be used in several use cases, such as automatic imports from WordPress™, Drupal™, and other apps. In other embodiments, the CMA may be integrated with other backend systems, such as an e-commerce shop.

The content preview API is a variant of the CDA for previewing your content before delivering it for use by consuming applications (i.e., for display). For example, the content preview API may be used in combination with a "preview" deployment of a website (or a "preview" build of a mobile app) that allows content managers and authors to view their work in-context, as if it were published, using a "preview" access token as though it were delivered by the CDA.

The images API allows for resizing and cropping of images, changing image background colors and/or converting images to different formats. In one embodiment, using the images API for these transformations allows for upload of high-quality assets, delivering exactly what an app needs.

Figure 10:
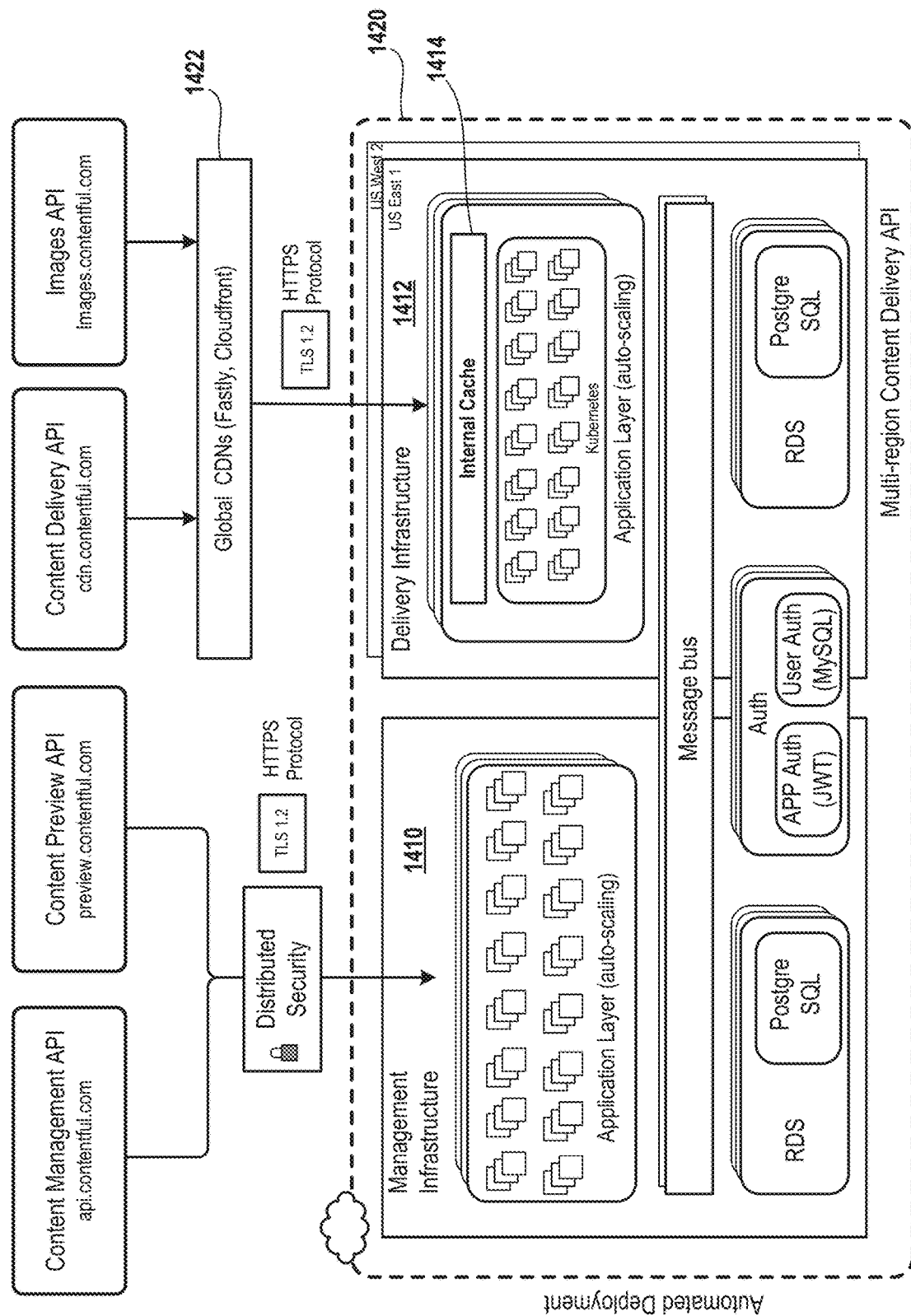
FIG. 10 illustrates an example of how a content management API (CMA) and a content preview API (CPA) can make calls to a content management system (CMS), in accordance with implementations of the disclosure.

FIG. 10 illustrates an example of how the content management API (CMA) and the content preview API (CPA) can make calls to the content management system (CMS) 1420. In one configuration, the CMS 1420 includes compute and storage resources for management of structured content. As described above, a web editor provides a user interface (UI) that remote client device uses to access the CMS 1420. Based on the type of content creation and/or editing being performed via the UI of the web editor, either the CMA or CPA are used to make API calls to the management 1410 compute and storage resources. The compute and storage resources which run the CMS 1420, in one embodiment, are run in a cloud-based environment. The cloud-based environment, for example, may be provided by a cloud compute and storage servicing entity, e.g., such as Amazon Web Services (AWS)™, Google™ Cloud, Microsoft™ Azure™, or other serving entity. In some embodiments, these servicing entities are referred to as hosting services, which provide the hardware and internet connectivity to execute applications, processes, and workflows using various types of hardware configurations. In other embodiments, private cloud systems may be run instead of using third-party hosting services. In some configurations, the hardware configurations may include virtualized hardware and expandable storage to meet the processing needs of the CMS 1420. Broadly speaking, the CMS 1420 is executed using cloud infrastructure, which includes the use of multiple interconnected data centers throughout the world.

In one configuration, the CMS 1420 also includes a delivery component 1412, which is configured to service processing operations from the content delivery API and the images API. As shown, in one embodiment, the delivery component 1412 is provisioned with internal cache 1414, which is optimized to interface with a global content delivery network (CDN), which in turn handles calls from the content delivery API and the images API. The CDN, in one embodiment, is a widely distributed service that enables rapid and efficient delivery of content to users throughout the world. In one embodiment, the delivery component 1412 is part of the CMS 1420, and is also executed on compute and storage of a cloud infrastructure. In one embodiment, structured content is prepared and/or edited using the management component 1410, before it is published for external consumption. By separating structured content in the cloud infrastructure, it is possible to prevent non-ready content to be accessed and delivered using the CDA.

Agents accessing the CMS 1420, including organizations, individual users, as well as APPs, are authenticated by an authentication and authorization system. In some implementations, user authentication uses MySQL. In some implementations, APP authentication uses JSON Web Tokens.

It should be apparent, that the present embodiments may be practiced without some or all of these specific details. Modification to the modules, code and communication interfaces are also possible, so long as the defined functionality for the content management system (CMS) or modules of the CMS maintained. In other instances, well-known process operations have not been described in detail in order not to unnecessarily obscure the present embodiments.

One or more embodiments can also be fabricated as computer-readable code on a non-transitory computer-readable storage medium. The non-transitory computer-readable storage medium is any non-transitory data storage device that can store data, which can thereafter be read by a computer system. Examples of the non-transitory computer-readable storage medium include solid state drives (SSDs), hard drives, network attached storage (NAS), read-only memory, random-access memory, persistent memory, CD-ROMs, CD-Rs, CD-RWs, magnetic tapes and other optical and non-optical data storage devices. The non-transitory computer-readable storage medium can include computer-readable storage medium distributed over a network-coupled computer system so that the computer-readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

The foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments and sample appended claims.

What is claimed is:

1. A method implemented in a content management system (CMS), for providing integration between third-party applications (APPs) configured for use with an editor application provided by the CMS, comprising:
    installing a first APP and a second APP in a content project of the CMS, the first APP and the second APP being ones of the third-party APPs, such that the first APP is provided by a first third-party provider and the second APP is provided by a second third-party provider, wherein installing the first and second APPs enables functionalities of the first and second APPs to be accessed for the content project through the editor application, wherein the editor application provides an interface for editing the content project;
    receiving, by the CMS from the first APP, a request to invoke an action by the second APP that effects an editorial change to the content project;
    responsive to receiving the request from the first APP, then validating, by the CMS, contents of the request to invoke the action by the second APP;
    responsive to successful validation of the request, then sending an acknowledgement from the CMS to the first APP, and generating a call from the CMS to the second APP to invoke the action by the second APP that effects the editorial change to the content project.

2. The method of claim 1, wherein the method enables the first APP to trigger the action by the second APP without requiring the first APP to communicate with the second APP.

3. The method of claim 1, wherein the request from the first APP to invoke the action by the second APP is received through an application programming interface (API) of the CMS.

4. The method of claim 1, wherein validating the contents of the request includes verifying whether the contents of the request adhere to predefined parameter requirements for invoking the action by the second APP.

5. The method of claim 1, wherein further responsive to receiving the request, authorizing the request, wherein authorizing the request includes verifying, based on a setting of the content project, that the first APP is authorized to request to invoke the action by the second APP.

6. The method of claim 1, wherein installing the second APP exposes the action of the second APP for invocation through the CMS during editing of the content project.

7. The method of claim 1, wherein installing the first APP includes configuring a permission setting of the content project to allow the first APP to invoke the action of the second APP.

8. The method of claim 1, wherein the acknowledgement indicates the successful validation of the request.

9. The method of claim 1, wherein the call to the second APP is configured to be asynchronous, such that the CMS does not wait for a result of the call to the second APP.

10. The method of claim 1, wherein the content project includes a plurality of content types and a plurality of content entries, said content entries being structured in accordance with said content types, said content entries being configured to store content of the content project that is editable through the editor application.

11. The method of claim 1, wherein the editor application is defined by a web application rendered through a client browser.

12. The method of claim 1, wherein the request from the first APP is received in response to occurrence of a predefined event of the first APP, such that the method enables automated triggering of the action of the second APP in response to the occurrence of the predefined event of the first APP.

13. The method of claim 1, wherein the call to the second APP is defined by a Hypertext Transfer Protocol (HTTP) call to a URL of the second APP call to a URL of the second APP.

14. The method of claim 1, wherein the first APP or the second APP is hosted by the CMS.

15. A method implemented in a content management system (CMS), for providing integration between third-party applications (APPs) configured for use with an editor application provided by the CMS, comprising:
    installing a first APP and a second APP in a content project of the CMS, the first APP and the second APP being ones of the third-party APPs, such that the first APP is provided by a first third-party provider and the second APP is provided by a second third-party provider, wherein installing the first and second APPs enables functionalities of the first and second APPs to be accessed for the content project through the editor application, wherein the editor application provides an interface for editing the content project;
    receiving, by the CMS from the first APP, a request to invoke an action by the second APP that effects an editorial change to the content project;
    responsive to receiving the request from the first APP, then validating, by the CMS, contents of the request to invoke the action by the second APP;
    responsive to successful validation of the request, then sending an acknowledgement from the CMS to the first APP, and generating a call from the CMS to the second APP to invoke the action by the second APP, wherein the call to the second APP is configured to be asynchronous, such that the CMS does not wait for a result of the call to the second APP;
    wherein the method enables the first APP to trigger the action by the second APP without requiring the first APP to communicate with the second APP that effects the editorial change to the content project.

16. The method of claim 15, wherein the request from the first APP to invoke the action by the second APP is received through an application programming interface (API) of the CMS.

17. The method of claim 15, wherein validating the contents of the request includes verifying whether the contents of the request adhere to predefined parameter requirements for invoking the action by the second APP.

18. The method of claim 15, wherein further responsive to receiving the request, authorizing the request, wherein authorizing the request includes verifying, based on a setting of the content project, that the first APP is authorized to request to invoke the action by the second APP.

19. The method of claim 15, wherein installing the second APP exposes the action of the second APP for invocation through the CMS during editing of the content project.

20. The method of claim 15, wherein installing the first APP includes configuring a permission setting of the content project to allow the first APP to invoke the action of the second APP.

21. The method of claim 15, wherein the acknowledgement indicates the successful validation of the request.

* * * * *